US010498751B2

(12) United States Patent
Yu et al.

(10) Patent No.: US 10,498,751 B2
(45) Date of Patent: Dec. 3, 2019

(54) INLINE DGA DETECTION WITH DEEP NETWORKS

(71) Applicant: Infoblox Inc., Santa Clara, CA (US)

(72) Inventors: Bin Yu, Pleasanton, CA (US); Mark Threefoot, Sunnyvale, CA (US)

(73) Assignee: Infoblox Inc., Santa Clara, CA (US)

( * ) Notice: Subject to any disclaimer, the term of this patent is extended or adjusted under 35 U.S.C. 154(b) by 112 days.

(21) Appl. No.: 15/721,210

(22) Filed: Sep. 29, 2017

(65) Prior Publication Data

US 2018/0351972 A1 Dec. 6, 2018

Related U.S. Application Data

(60) Provisional application No. 62/513,141, filed on May 31, 2017.

(51) Int. Cl.
*H04L 29/06* (2006.01)
*H04L 29/12* (2006.01)

(52) U.S. Cl.
CPC ...... *H04L 63/1416* (2013.01); *H04L 61/1511* (2013.01); *H04L 63/1441* (2013.01); *H04L 63/1458* (2013.01); *H04L 63/1466* (2013.01); *H04L 61/2007* (2013.01)

(58) Field of Classification Search
CPC ............ H04L 63/1416; H04L 63/1441; H04L 61/1511; H04L 61/2007
USPC ....................................................... 726/26
See application file for complete search history.

(56) References Cited

U.S. PATENT DOCUMENTS

| 2015/0264070 A1* | 9/2015 | Harlacher | ........... H04L 63/1441 |
| | | | 726/23 |
| 2015/0373039 A1* | 12/2015 | Wang | ........... H04L 63/1425 |
| | | | 726/23 |
| 2017/0163603 A1* | 6/2017 | Xu | ........... H04L 63/1416 |
| 2017/0244741 A1* | 8/2017 | Ferrer | ........... G06Q 50/01 |

OTHER PUBLICATIONS

Abadi et al., TensorFlow: Large-Scale Machine Learning on Heterogeneous Distributed Systems, Nov. 9, 2015, pp. 1-19.
Antonakakis et al., From Throw-Away Traffic to Bots: Detecting the Rise of DGA-Based Malware, USENIX Security Symposium, 2012, vol. 12.
Author Unknown, DGArchive, Fraunhofer FKIE, Sep. 27, 2017 https://dgarchive.caad.fkie.fraunhofer.de/.
(Continued)

*Primary Examiner* — Teshome Hailu
(74) *Attorney, Agent, or Firm* — Van Pelt, Yi & James LLP

(57) ABSTRACT

Various techniques for providing inline DGA detection with deep networks are disclosed. In some embodiments, a system, process, and/or computer program product for inline DGA detection with deep networks includes receiving a DNS data stream, in which the DNS data stream includes a DNS query and a DNS response for resolution of the DNS query; determining whether the DNS query is associated with a potentially malicious network domain based on the inline DGA detection model; and performing a mitigation action if it is determined that the DNS query is associated with a potentially malicious network domain based on the inline DGA detection model.

23 Claims, 11 Drawing Sheets

(56) References Cited

OTHER PUBLICATIONS

Author Unknown, Does Alexa Have a List of Its Top-Ranked Websites?, Alexa Support, Sep. 27, 2017, https://support.alexa.com/hc/en-us/articles/200449834-Does-Alexa-have-a-list-of-its-top-ranked-websites-.
Author Unknown, Google Books Ngram Viewer, Sep. 27, 2017, http://storage.googleapis.com/books/ngrams/books/datasetsv2.html.
Author Unknown, Osint Feeds from Bambenek Consulting, Sep. 27, 2017, http://osint.bambenekconsulting.com/feeds/.
Author Unknown, Threat Hunting with Passive DNS: A Real-World Investigation with Farsight Security and Deloitte, Sep. 27, 2017, https://www.farsightsecurity.com/.
Chollet, Keras: Deep Learning for Python, Github, Sep. 27, 2017, https://github.com/fchollet/keras.
Glorot et al., Understanding the Difficulty of Training Deep Feedforward Neural Networks, Proccedings of the 13th International Conference on Artificial Intelligence and Statistics, 2010, pp. 249-256, vol. 9.
Goodfellow et al., Deep Learning, MIT Press, Sep. 27, 2017, http://www.deeplearningbook.org.
Hochreiter et al., Long Short-Term Memory, Neural Computation, 1997, pp. 1735-1780, vol. 9, Issue. 8.
Kingma et al., Adam: A Method for Stochastic Optimization, ICLR, 2015.
Krishnan et al., Crossing the Threshold: Detecting Network Malfeasance via Sequential Hypothesis Testing, 43rd Annual IEEE/IFIP International Conference on Dependable Systems and Networks, 2013, pp. 1-12.
Mikolov et al., Efficient Estimation of Word Representations in Vector Space, Preprint arXiv:1301.3781, Sep. 7, 2013.
Schiavoni et al., Phoenix: DGA-Based Botnet Tracking and Intelligence, DIMVA 2014, LNCS 8550, 2014, pp. 192-211, Springer International Publishing, Switzerland.
Shannon, A Mathematical Theory of Communication, The Bell System Technical Journal, 1948, vol. 27.
Srivastava et al., Dropout: A Simple Way to Prevent Neural Networks from Overfitting, Journal of Machine Learning Research, Jun. 2014, vol. 15, pp. 1929-1958.
Woodbridge et al., Predicting Domain Generation Algorithms with Long Short-Term Memory Networks, Preprint arXiv:1611.00791, Nov. 2, 2016.
Yadav et al., Detecting Algorithmically Generated Domain-Flux Attacks with DNS Traffic Analysis, IEEE/ACM Transactions on Networking, Oct. 2012, pp. 1663-1677, vol. 20, No. 5.
Yadav et al., Detecting Algorithmically Generated Malicious Domain Names, Proceedings of the 10th ACM SIGCOMM Conference on Internet Measurement, Nov. 1-3, 2010, pp. 48-61.
Yu et al., Behavior Analysis Based DNS Tunneling Detection and Classification with Big Data Technologies, Proceedings of the International Conference on Internet of Things and Big Data, 2016, pp. 284-290.
Yu et al., Semi-Supervised Time Series Modeling for Real-Time Flux Domain Detection on Passive DNS Traffic, MLDM 2014, LNAI 8556, 2014, pp. 258-271, Springer International Publishing, Switzerland.
Zhang et al., Character-Level Convolutional Networks for Text Classification, Advances in Neural Information Processing Systems, 2015, pp. 649-657.

\* cited by examiner

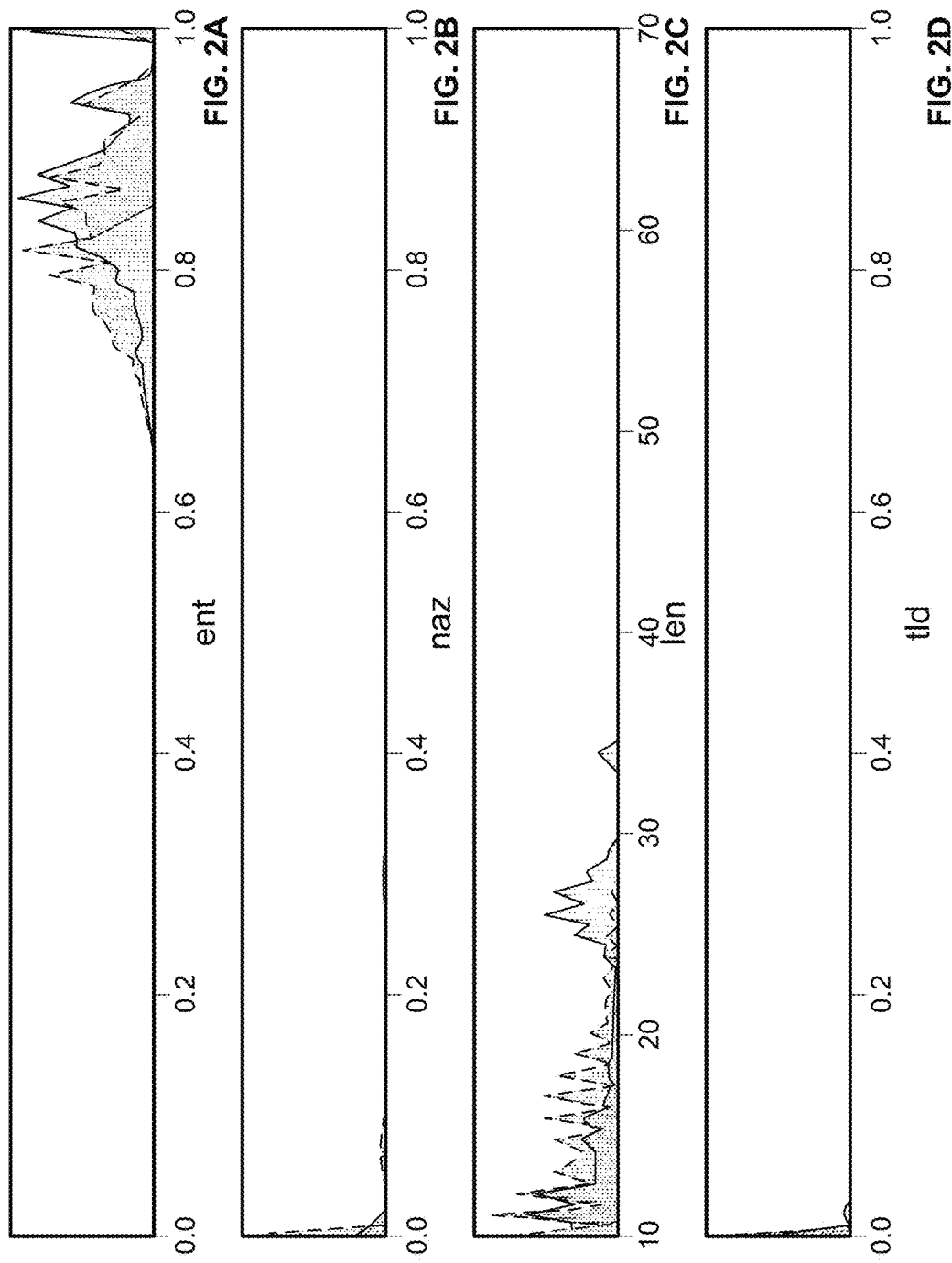

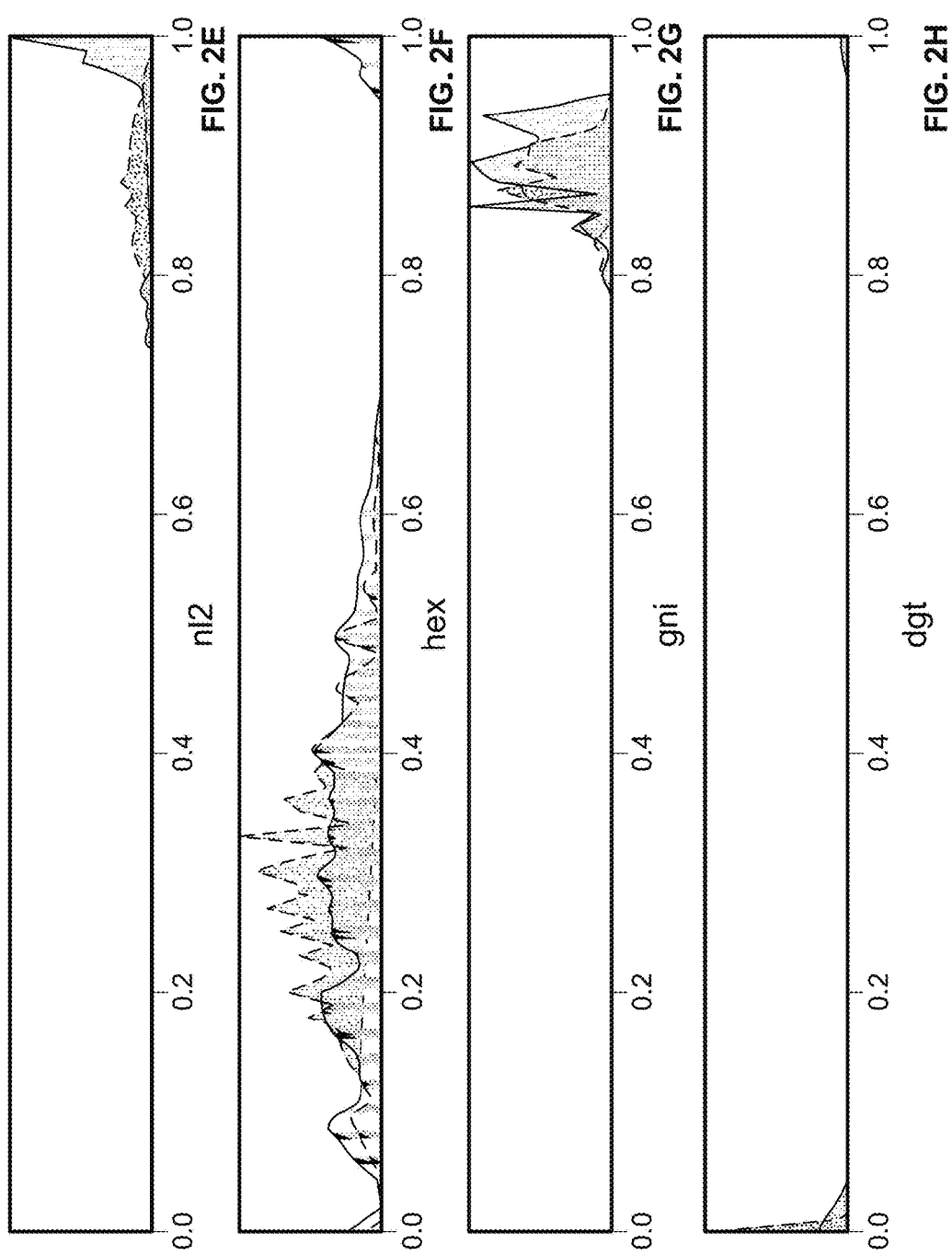

INLINE DGA DETECTION WITH DEEP NETWORKS

CROSS REFERENCE TO OTHER APPLICATIONS

This application claims priority to U.S. Provisional Patent Application No. 62/513,141 entitled INLINE DGA DETECTION WITH DEEP NETWORKS filed May 31, 2017 which is incorporated herein by reference for all purposes.

BACKGROUND OF THE INVENTION

Domain Generation Algorithms (DGAs) are now commonplace among malware. DGA malware automatically generates large numbers of domain names in Domain Name System (DNS) domain fluxing, in order to bypass domain blacklisting.

For example, DGAs are often used by botnet controllers (e.g., masters of bots) for Command-and-Control (C&C) communications of botnets to dynamically produce a large number of random domain names and select a relatively small subset of those domain names for actual command and control use. In order to mitigate the risk presented by these large numbers of potentially malicious domains, it is useful to be able to automatically detect DGA generated Uniform Resource Locators (URLs).

BRIEF DESCRIPTION OF THE DRAWINGS

Various embodiments of the invention are disclosed in the following detailed description and the accompanying drawings.

FIGS. 2A-K provide charts illustrating a distribution of selected features on a sample of the retrospective data with filtering in accordance with some embodiments.

DETAILED DESCRIPTION

Figure 1A:
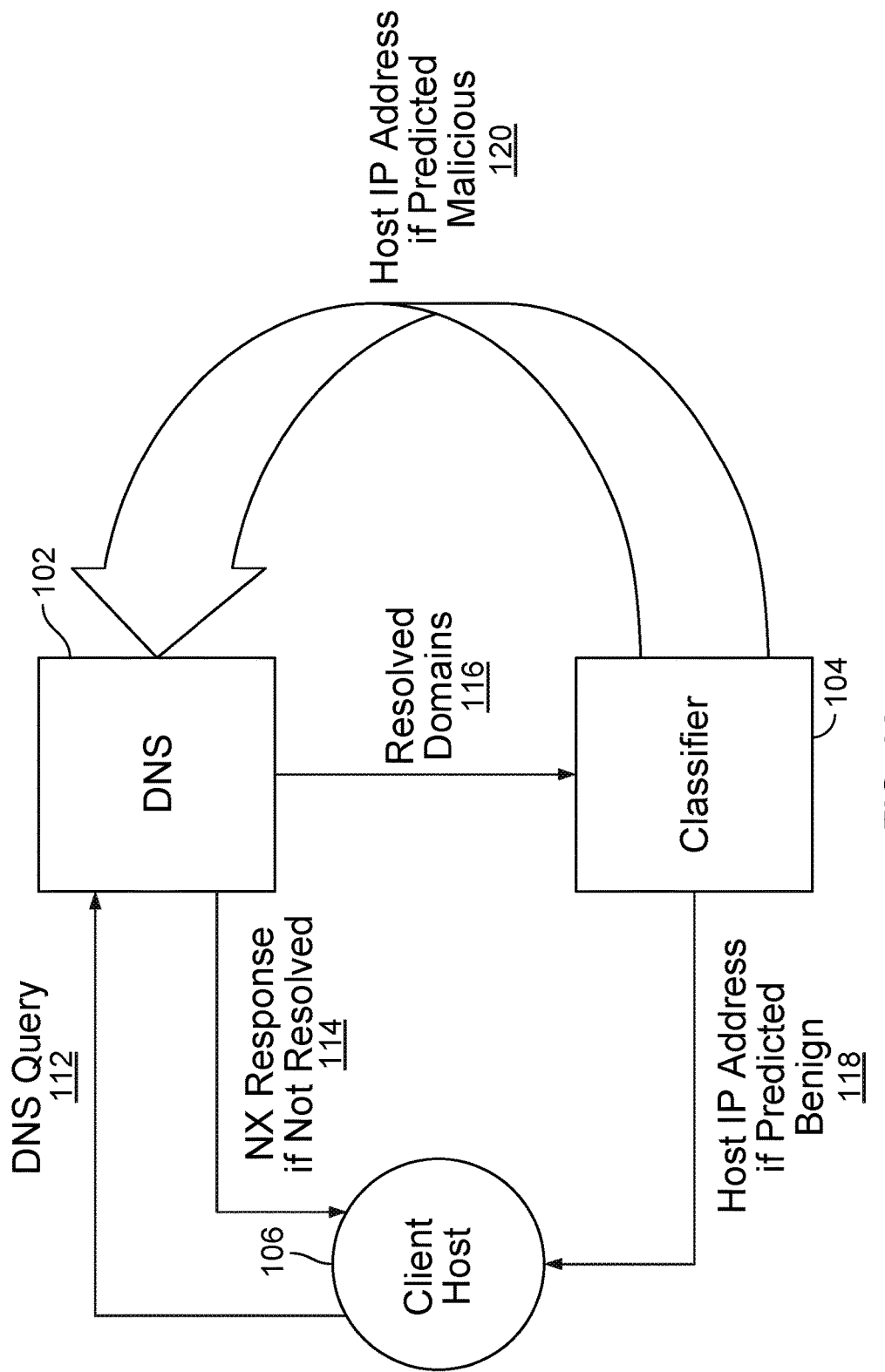
FIG. 1A is a block diagram of a system for inline DGA detection with deep networks in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Domain Generation Algorithms (DGAs) are now commonplace among malware. DGA malware automatically generates large numbers of domain names in Domain Name System (DNS) domain fluxing, in order to bypass domain blacklisting.

For example, DGAs are often used by botnet controllers for Command-and-Control (C&C) communications of botnets to dynamically produce a large number of random domain names and select a relatively small subset of those domain names for actual command and control use. In order to mitigate the risk presented by these large numbers of potentially malicious domains, it is useful to be able to automatically detect DGA generated Uniform Resource Locators (URLs). However, static prevention approaches like existing, traditional domain blacklisting approaches and existing, traditional sinkholing approaches are typically not effective in countering DGA malware.

Generally, DGA malware is one of the most active types of malware that generates a large number of domains of which few are resolved for C&C communications. Rather, most DGA generated domains when queried result in a Non-Existent Domain (NXDomain) response from a DNS server. Most of the existing, traditional DGA detection approaches are: 1) based on simulation DNS data generated by reverse engineered DGAs; and/or 2) targeted at detecting domains with NXDOMAIN responses or post events.

As such, the existing, traditional approaches for DGA detection have at least two significant problems. First, such existing, traditional approaches for DGA detection are not effective at detecting new DGA variations as reverse engineered algorithms are often delayed in availability. A second problem is that such existing, traditional approaches for DGA detection are not timely when targeted at post events and, therefore, cannot provide real-time detection and enforcement against DGA malware.

Overview of Techniques for Inline DGA Detection with Deep Networks

DGA detection on a live stream of DNS queries in a DNS server is referred to as inline DGA detection. However, as discussed above, the existing, traditional approaches for DGA detection generally cannot be used for real-time detection and enforcement against DGA malware. As a result, inline DGA detection is desirable as it can be used, for example, to proactively block access to malicious domains in real time to facilitate enforcement against DGA malware.

Accordingly, various techniques for inline DGA detection with deep networks are disclosed. For example, the disclosed techniques for inline DGA detection with deep networks include providing a model (e.g., implemented using a classifier(s)) that is generated using deep learning techniques (e.g., deep neural networks or also referred to as deep networks).

In some embodiments, a system, process, and/or computer program product for inline DGA detection with deep networks includes receiving a set of DNS training data, in which the set of DNS training data includes resolved and unresolved DNS query results; inputting the set of DNS training data to generate an inline DGA detection model using a deep neural network, in which the inline DGA detection model includes a classifier; and deploying the inline DGA detection model to perform inline DGA detection on live DNS traffic.

In some embodiments, a system, process, and/or computer program product for inline DGA detection with deep networks includes receiving a DNS data stream (e.g., a live DNS data stream), in which the DNS data stream includes a DNS query and a DNS response for resolution of the DNS query; determining whether the DNS query is associated with a potentially malicious network domain based on an inline DGA detection model (e.g., a classifier(s) generated using a deep neural network and training data); and performing a mitigation action if it is determined that the DNS query is associated with a potentially malicious network domain based on the inline DGA detection model. For example, one or more of the following mitigation actions can be performed: generating a firewall rule based on the potentially malicious network domain; configuring a network device to block network communications with the potentially malicious network domain; quarantining an infected host, in which the infected host is determined to be infected based on an association with the potentially malicious network domain; and adding the potentially malicious network domain to a reputation feed. In some cases, the system, process, and/or computer program product for inline DGA detection with deep networks further includes identifying a source IP address, a source host, or an attempt to query the potentially malicious network domain.

For example, real-time DGA detection, unlike reactionary or offline detection, is performed in real time on a live stream of DNS queries in a DNS server/appliance (e.g., and can restrict input to the domain name string without other context information). As further described below, real DNS traffic data is used to train and evaluate a DGA detection model(s) (e.g., one or more classifier(s), which in some cases, can effectively and efficiently receive as input a domain name, and determine a probability of that domain name being an NXDOMAIN, such as further described below).

Moreover, in contrast to previous approaches that do not rely on unsupervised machine learning techniques, the disclosed DGA detection model(s) (e.g., classifier(s)) are trained with real DNS traffic data (e.g., up-to-date real DNS traffic data), rather than synthetic DNS data sets (e.g., simulation samples of DNS data). In this example, the DGA detection model(s) is targeted at real-time DNS queries for inline detection to facilitate real-time enforcement against DGA malware using the disclosed techniques. Furthermore, unlike previous approaches, the disclosed techniques can capture C&C IP addresses for blacklisting.

As an example, within a network (e.g., an enterprise computer network) that is infected with DGA malware (e.g., DGA malware families), DNS queries (e.g., in types A and AAAA) are either resolved with IP addresses or have an NXDOMAIN response. Except for a few resolved domains generated by the DGA malware, most of the DNS queries in the network are for legitimate domains. As a result, it is generally safe to treat resolved domains as negative samples (negatives). On the other side, the vast majority of NXDOMAIN responses are typically a result of DGA generated domains. With various cleanup processes to remove legitimate DNS queries typically generated by misspellings and/or common typographical errors, they can be treated as positive samples (positives) for supervised learning without human labor involved in this expensive truth marking process. Generally, it is economically trivial to collect such sample DNS data from real traffic in large volumes. Therefore, a DGA detection model(s) trained against such a real DNS data set that is automatically annotated using the disclosed techniques can be used to determine a probability of a given domain to result in an NXDOMAIN response as will be further described below with respect to various embodiments.

In some embodiments, given that DGA generated domains typically share common characteristics reflected in the DGA detection model, a domain that is classified to result in an NXDOMAIN response on the one hand (e.g., based on a DGA detection model(s) generated using the disclosed techniques) and does get resolved to IP addresses on the other hand can be sinkholed and its resolved IP addresses can be blacklisted (e.g., after review, such as by a DNS/security service provider, IT/network/security administrator, or another entity and/or automated review/verification process). As further described below, the disclosed DGA detection model(s) (e.g., classifier(s)) facilitates an efficient and effective solution for predicting a probability of a given domain to result in an NXDOMAIN response.

In one embodiment, DGAs generate large numbers of domains that share various characteristics that are grouped into clusters based on one or more features (e.g., clustering the DGA generated domains in a feature or mathematical space). On the other side, legitimate NXDOMAIN entries generally do not share much commonality and, therefore, do not cluster effectively based on such features (e.g., in such a feature or mathematical space). As such, the disclosed techniques include applying machine learning techniques (e.g., deep learning techniques) to facilitate complex DGA detection, such as further described below. For example, many supervised machine learning models can be applied in solving this problem (e.g., clustering based on one or more features of DGA generated domains) such as neural network (NN) and k-NN with featureful and featureless approaches. As another example, a convolutional neural network (CNN) with deep learning technique is disclosed below that can be applied to detect traditional DGA as well as dictionary DGA families.

Introduction—Inline DGA Detection with Deep Networks

As similarly described above, DGAs generally generate large numbers of domain names of which few get resolved for C&C communication. This method of C&C communication between bot and master evades existing, traditional approaches for impeding botnet activity, which are largely based on static lists of domain names (i.e., domain name blacklists). The challenge to catch malicious domain names that are generated dynamically has led to recent interest in detecting DGA domains using machine learning algorithms.

Models that predict based solely on the domain name string are of particular interest for their generality: context information beyond the domain name string is generally unavailable or expensive to acquire.

Detecting DGA retrospectively through approaches such as clustering has been well explored, but has the disadvantage of being reactionary. These approaches are based on analysis of batches of traffic, which means DGA domains are likely to establish communication before being detected. As such, it is desired to detect DGA domains in real-time, predicting on a per domain basis, to facilitate the disclosed inline DGA detection techniques that can prevent any C&C communication. Relatively little progress has been made on this challenge so far by existing approaches. Predicting on a per example basis is generally a supervised learning problem, and thus requires labeled data. Labeled DGA domains can be obtained through reverse engineering malware. Domains coming from the Alexa list of top-ranked web sites (see e.g., [1] "Does Alexa have a list of its top-ranked websites?" available at https://support.alexa.com/hc/en-us/articles/200449834-Does-Alexa-have-a-list-of-its-top-ranked-websites-) are usually used as examples of non-malicious domains. There are a couple of problems with this approach:

First, reverse engineering DGA malware is a tedious task, and models trained in this manner will become outdated as new DGA malware families emerge in real traffic.

Second, there is no guarantee that domains from Alexa form a good representative set of non-malicious domains within a specific network.

To overcome these problems, the disclosed techniques include obtaining labeled data towards training an inline DGA detector in accordance with some embodiments. The disclosed techniques are based on real traffic and do not require the reverse engineering of DGA malware to obtain malicious domains. When a domain name is queried for which no IP address exists, the client is returned a Non-Existent Domain (NXDomain) response. Based on observations of DGA behavior, heuristic filtering on billions of NXDomains is performed with the intent of creating a noise-not-free but practical data set of live DGA domains collected from real traffic. Specifically, negatives (legitimate domains) are collected from resolving traffic, and positives (potential DGA domains) are collected from non-resolving traffic. The reasoning for using NXDomain traffic is as follows. First, only a small subset of DGA domains are actually intended for C&C communication and resolved. The vast majority of DGA domains do not resolve. This behavior means that DGA domains are largely isolated to NXDomain traffic. By the same reasoning, resolving traffic is generally non-DGA, and thus benign (e.g., in a significant majority of the cases). Second, looking solely at the domain name strings, DGA domains that resolve should be indistinguishable from those that do not (e.g., we expect that DGA domains used for C&C communication are generated in the same manner as non-resolving DGA domains).

Large amounts of resolving/non-resolving "labeled" data is easy to obtain without the need for human annotators. Most NXDomains are benign however (e.g., noise, non-malicious, non-DGA domains resulting from human and/or software errors). In one embodiment, to boost the signal of DGA domains, filtering is performed based on how we expect to observe DGAs in real traffic (e.g., a DGA domain is typically disposable and will not be reproduced outside a very short span of time, such as seven days, neither from the same host nor a different host). The binary classification models (e.g., classifiers) that we train over this filtered data set can be deployed at a DNS server/appliance (e.g., or as a component to another server/appliance or as a cloud-based service) to impede botnets by preventing malicious responses to infected clients (e.g., see FIG. 1A as further described below). Furthermore, domains that are predicted malicious, yet do resolve, are likely resolving to a C&C IP address. Thus, our model is not only useful for passively blocking C&C communication, but also for detecting C&C servers.

This strategy allows for an enormous amount of labeled data to be obtained. This opens the door to using deep networks (e.g., also referred to as deep neural networks) for this classification task, which boasts many advantages over traditional methods. Deep learning has achieved state-of-the-art results on many complex tasks in recent years, while also performing efficient classification, essential for an inline DGA detection scheme. Deep neural nets can also learn features automatically, bypassing the human effort of feature engineering. As such, deep neural nets are well-suited for DGA detection, as malware authors could use knowledge of human engineered features to better blend with legitimate traffic. Perhaps the most useful feature of deep learning for DGA detection is online learning. Many traditional models must be fit from scratch in order to update them. Neural networks can be tuned continuously. Thus, a neural net can be deployed and used for DGA detection while simultaneously training on live traffic. This property should allow the disclosed DGA detection model(s) to keep up with DGAs as they change in the wild.

In one embodiment, two types of deep neural networks are trained and evaluated: (1) a convolutional neural network (CNN); and (2) a recurrent neural network (RNN, such as a long short-term memory (LSTM) type of RNN). Example neural network implementations operate at the character-level, and are given only the domain name string without other context. To create a baseline for our models, we also evaluate traditional machine learning models using human engineered features.

Low false positive rate is a clear priority for an inline DGA detection scheme. We set the threshold for the models at a false positive rate of 1 in 10,000 against our filtered data, and report results in terms of accuracy, AUC, and true positive rate. At this restrictive threshold, our best deep learning model still achieves 40.31% true positive rate against our validation set.

In order to establish ground truth and evaluate the performance of our classifier, we turn to a repository of known DGA domains, DGArchive (e.g., [2] "DGArchive," Fraunhofer FKIE, available at https://dgarchive.caad.fkie.fraunhofer.de/, or another set of known DGA domains can be utilized), for concrete validation. Against this sample of DGA/non-DGA truth marked data, our best example deep learning model achieves 72.89% TPR and 0.31% FPR.

In some embodiments, a CNN model is deployed on a live stream of traffic to observe what is flagged malicious. For example, the deployed CNN model (e.g., classifier) can analyze IP addresses resolved by flagged domains in the live stream of traffic stream, namely by inspecting the list of domains which resolve to them. In this way, many IPs that are, beyond reasonable doubt (e.g., based on a threshold), malicious can be detected using the disclosed techniques as further described below.

In some embodiments, criteria for creating a noise-not-free DGA/non-DGA data set from real traffic that bypasses the difficulty of explicit labeling are provided using the disclosed techniques. Character-level deep learning techniques for DGA detection are then trained and evaluated using this filtered data. In addition, this filtered data can be used to train and evaluate traditional machine learning techniques using manually extracted features.

Background on Using DNS Data for Detecting Malicious Activities in a Network

DNS data is extremely useful for detecting malicious activities in a network, including fast-fluxing, tunneling and DGAs (see e.g., [3] B. Yu, L. Smith, M. Threefoot, and F. Olumofin, "Behavior analysis based DNS tunneling detection and classification with big data technologies," in Proc. of the International Conference on Internet of Things and Big Data, 2016, pp. 284-290; [4] B. Yu, L. Smith, and M. Threefoot, "Semi-supervised time series modeling for real-time flux domain detection on passive DNS traffic," in Proc. of the 10th International Conference on Machine Learning and Data Mining, 2014, pp. 258-271; [5] S. Yadav, A. K. K. Reddy, A. Reddy, and S. Ranjan, "Detecting algorithmically generated malicious domain names," in Proceedings of the 10th ACM SIGCOMM Conference on Internet Measurement, 2010, pp. 48-61; and [6] S. Yadav, A. K. K. Reddy, A. N. Reddy, and S. Ranjan, "Detecting algorithmically generated domain-flux attacks with DNS traffic analysis," IEEE/ACM Transactions on Networking, vol. 20, no. 5, pp. 1663-1677, 2012). In the case of DGA detection, a large number of previous works are based on a retrospective approach: that is, data is collected over a time period and then a classification algorithm is performed on the collected data (see e.g., [5], [6]).

In [7] S. Schiavoni, F. Maggi, L. Cavallaro, and S. Zanero, "Phoenix: DGA-based botnet tracking and intelligence," in International Conference on Detection of Intrusions and Malware, and Vulnerability Assessment, 2014, pp. 192-211, clustering is used during an offline phase where domains are grouped based on domain-related features. From each cluster of domains, linguistic features are extracted and used to build signatures for catching DGA domains during an online phase.

A hybrid (offline, online) approach is also used by [8] M. Antonakakis, R. Perdisci, Y. Nadji, N. Vasiloglou II, S. Abu-Nimeh, W. Lee, and D. Dagon, "From throw-away traffic to bots: Detecting the rise of DGA-based malware," in USENIX Security Symposium, vol. 12, 2012, where potentially malicious domains are first clustered, and then properties of these clusters are extracted and subsequently used for catching the command-and-control center during an online phase.

All of these works exhibit the following characteristics:
They are based on human engineered features.
They are trained and evaluated on synthetic data sets (e.g., Alexa and a list of domains obtained by reverse engineered malware).

Whenever human engineered features are used, it is obvious that it opens the door for an adversary to carefully craft its DGA to avoid detection by using the aforementioned features. Moreover, synthetic data sets might be substantially different from what is present in real traffic. Thus, validation based solely on such data sets might not reflect how well these classifiers would perform in a real world situation.

In [9] S. Krishnan, T. Taylor, F. Monrose, and J. McHugh, "Crossing the threshold: Detecting network malfeasance via sequential hypothesis testing," in 43rd Annual IEEE/IFIP International Conference on Dependable Systems and Networks, 2013, pp. 1-12, DGAs are detected by observing the number of DNS requests by a client that obtain an NX answer and applying hypothesis testing. Despite avoiding the use of human engineered features, the approach proposed in [9] needs to segregate DNS requests by IP addresses of the clients. IP addresses can be seen as private information and it is desirable to have methods that do not need such information.

Another work that explores the use of character-level LSTM for DGA detection is [10] J. Woodbridge, H. S. Anderson, A. Ahuja, and D. Grant, "Predicting domain generation algorithms with long short-term memory networks," preprint arXiv: 1611.00791, 2016. However, in [10], they train with DGA/non-DGA labeled data. For non-DGA examples, they use Alexa Top 1M domains. For DGA domains, they use the OSINT DGA feed from Bambenek Consulting (see [11] "Osint feeds from bambenek consulting," Bambenek Consulting, available at http://osint-.bambenekconsulting.com/feeds/). The sample used contains varying numbers of examples from thirty DGA families with a total of approximately 750,000 examples in [10].

Accordingly, unlike the above-described or other known approaches, the disclosed techniques provide novel solutions for applying deep learning for real-time DGA detection to facilitate inline DGA detection (1) without the use of human engineered features, and (2) with the use of real traffic, rather than synthetic data, for training.

Overview of a System and a System Architecture for Performing Inline DGA Detection with Deep Networks FIG. 1A is a block diagram of a system for inline DGA detection with deep networks in accordance with some embodiments. FIG. 1A depicts how a classifier 104 can be deployed for inline DGA detection, showing a transaction with an infected client host or client host 106. Client host 106 performs a DNS query as shown at 112. If the DNS query is not resolved by a DNS server 102, then DNS server 102 sends an NXDomain response as shown at 114. Domains which resolve at DNS server 102 are checked as shown at 116 to predict if they are malicious using classifier 104. Benign and NXDomain responses can be returned to client host 106 as shown at 118 while potentially malicious responses are blocked as shown at 120 to impede communication with a C&C server (e.g., as a result of the host IP address being predicted to be malicious by classifier 104). IP addresses associated with potentially malicious domains may also be further investigated (e.g., for potential blacklisting and/or other remedial actions based upon further investigation/verification of the IP addresses associated with potentially malicious domains).

Figure 1B:
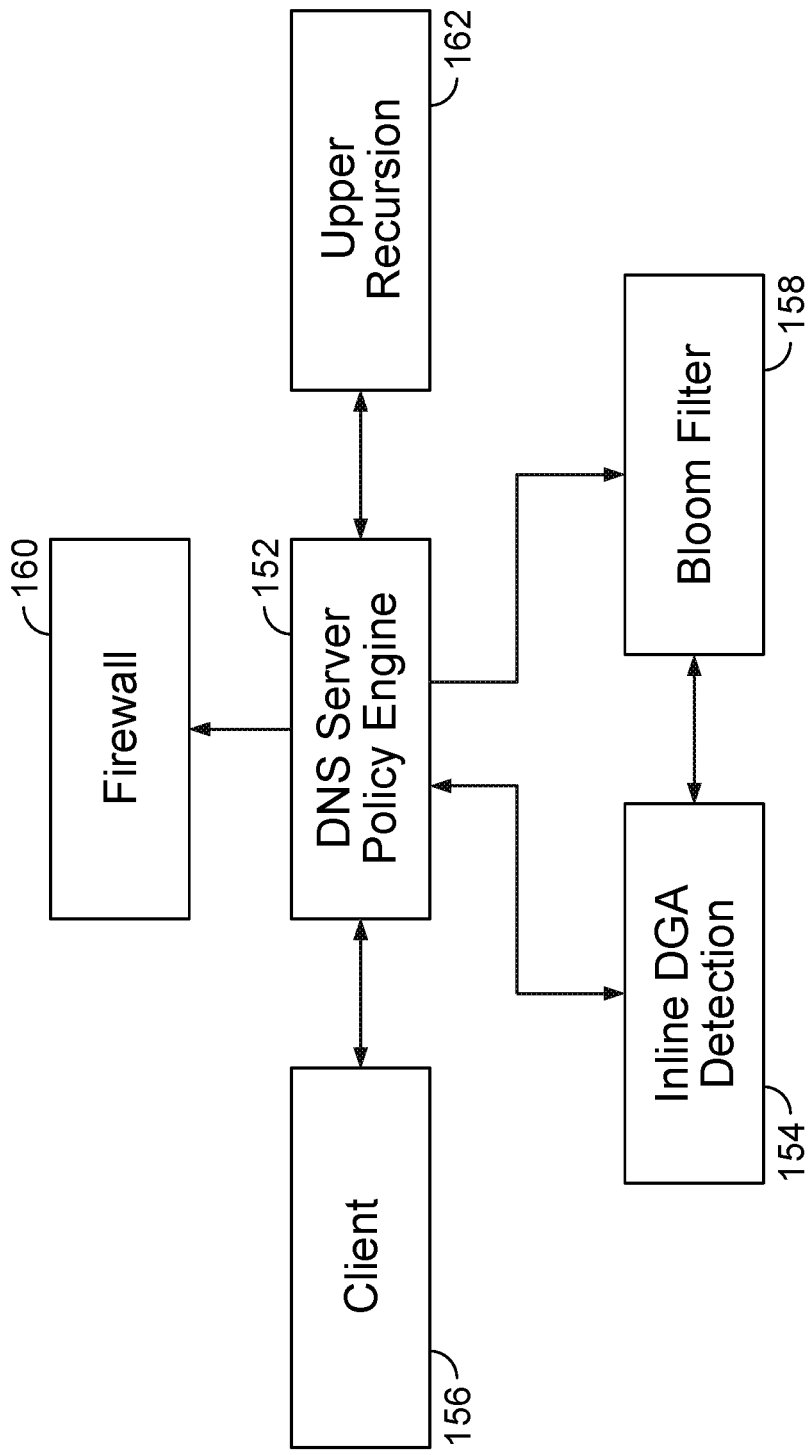
FIG. 1B is a block diagram of a system architecture for inline DGA detection with deep networks in accordance with some embodiments.
Figure 2I:
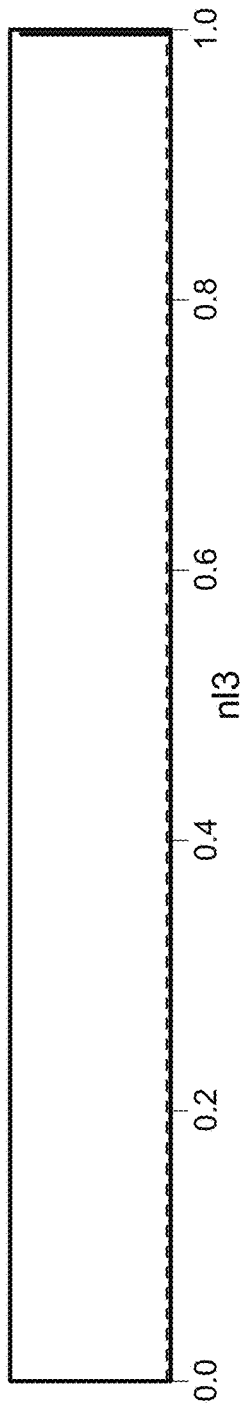
Figure 2J:
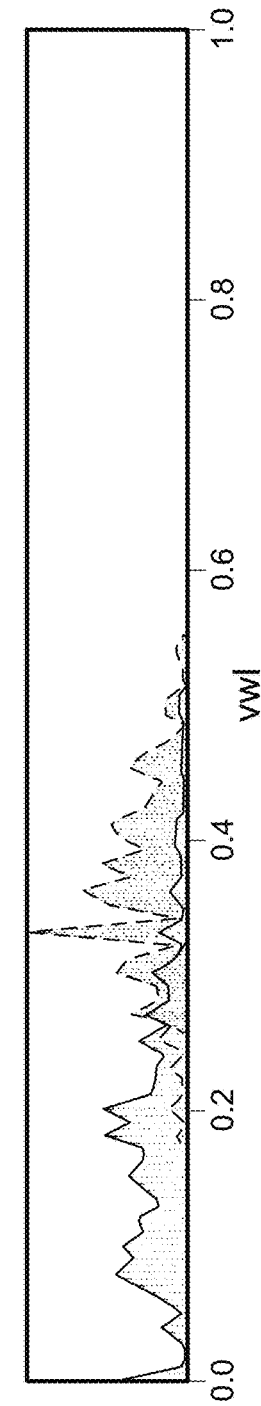
Figure 2K:
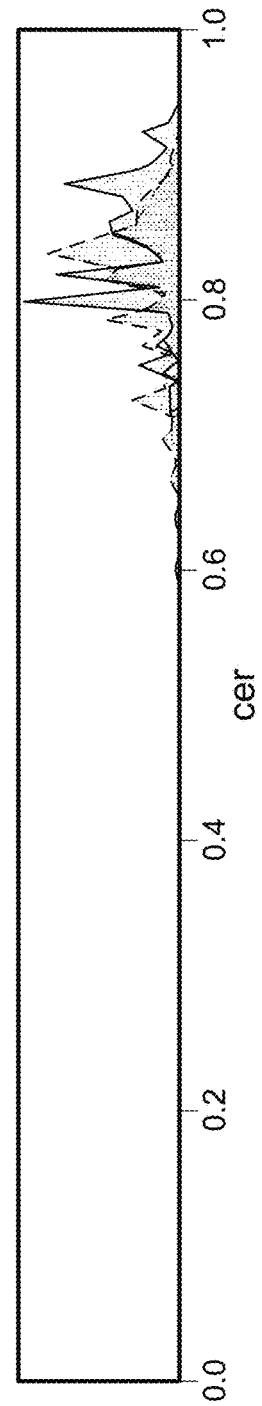

FIG. 1B is a block diagram of a system architecture for inline DGA detection with deep networks in accordance with some embodiments. FIG. 1B depicts how a classifier can be deployed for providing an inline DGA detection component as shown at 154. Client host 156 is in communication with a DNS server policy engine as shown at 152 for performing DNS queries. For example, if client 156 sends a DNS query (e.g., A/AAAA query) to DNS server policy engine 152, and if not cached, then DNS server policy engine 152 forwards the DNS query to an upper recursion 162 and also to an inline DGA detection component 154. If DNS server policy engine 152 receives a DNS response from upper recursion 162 and inline DGA detection timed out, then the DNS response is sent back to client 156. Inline DGA detection 154 checks a bloom filter 158 to determine if positive (i.e., this particular DNS query is likely in the set of DNS queries maintained by the bloom filter), then return null; otherwise, the bloom filter result is negative (i.e., this particular DNS query is definitely not in the set of DNS queries maintained by the bloom filter) and inline DGA detection is performed to determine whether the DNS query is determined to be associated with DGA malware (i.e., a positive result is a prediction that it is malicious using the inline DGA detection classifier) or not (i.e., a negative result is a prediction that it is not malicious using the inline DGA detection classifier). If the DNS query is resolved and detection is positive from inline DGA detection 154 (e.g., domains which resolve at DNS server 152 are checked against the classifier implemented by inline DGA detection 154 to predict if they are malicious as similarly described above with respect to FIG. 1A), then DNS server policy engine 152 sends the resolved IP address to a firewall 160 (e.g., adding the resolved IP address to a blacklist to a firewall, in which firewall 160 can be implemented as a distinct product/service, such as a security server/appliance and/or security service, a component of the DNS server/appliance, and/or combinations thereof). If the DNS query is resolved and detection is negative from inline DGA detection 154, then the DNS query can be added to bloom filter 158, and inline DGA detection 154 can continue online learning using the disclosed techniques as further described below. As such, benign and NXDomain responses can be returned to client host 156 while potentially malicious responses can be blocked to impede communication with a C&C server (e.g., as a result of the host IP address being predicted to be malicious by the classifier implemented by inline DGA detection 154 using the disclosed techniques for inline DGA detection using deep networks).

Creation of the Data Set

Unlike most of the traditional approaches that use reverse engineered DGA algorithms to generate positive samples, real and live traffic DNS data can be used as samples to train a classifier that can target active DGA to facilitate inline DGA detection with deep networks in accordance with some embodiments. In an example implementation, the raw DNS data used in this example implementation is a real-time stream of DNS data provided by Farsight Security, Inc. (e.g., [12] Farsight Security, Inc. provides commercially available DNS data, available at https://www.farsightsecurity.com/). In this example, this DNS data includes roughly 10 billion DNS queries per day collected from subscribers including ISPs, schools, and businesses from September 2015 through April 2017 (e.g., this data is private DNS data that is commercially available from Farsight Security, Inc. or other real and live traffic DNS data can similarly be used as samples to train a classifier that can target active DGA to facilitate inline DGA detection with deep networks in accordance with some embodiments).

In one embodiment, given that it is not efficient or feasible to have human annotators truth mark such a large amount of DNS data, the following selection logic is applied, based on the assumption that a DGA generated domain will not be regenerated over a long period of time, to A and AAAA type queries (e.g., these queries account for 78% of the overall volume). As similarly described above, domain names that have been resolved at least once, never resulted in an NXDomain response, and span more than 30 days or some other threshold number of days (e.g., this time span filtering parameter can be defined as the number of days between the first and last query for a given domain) can be categorized as negative examples (e.g., automatically annotated as legitimate domains). Domain names that have never resolved but consistently resulted in NXDomain responses (e.g., at least 10 times or some other threshold value), and have all occurrences within the span of 7 days with standard deviation 3 days or less (e.g., or some other threshold number of days can be used for this filtering parameter) can be categorized as positive examples (e.g., automatically annotated as malicious domains). In this example, the filtering parameters are chosen based on statistical observation of DGA behavior in real traffic. Furthermore, we assume that a DGA domain is a primary domain that can be registered under a publicly available top level domain (TLD). We take the second level domain (SLD) as the domain name string, and exclude all examples where the domain extends past the SLD (i.e., has a third level domain). Further, in this example, in order to further minimize noise, only domains that have at least 10 characters are selected. In some embodiments, this length based filtering is also applied when the inline DGA detection model(s) is deployed.

For example, Table 1 shown below provides an overview of the DNS data sets. The positive examples in the gold data set are reverse engineered DGA domain names. In all other data sets, positive examples are NXDomains, and negative examples are domains that are resolved as described above.

TABLE I

OVERVIEW OF DATA SETS.

| Set | Positives | Negatives | Observation Dates |
|---|---|---|---|
| Train | 9,121,642 (9.1M) | 8,767,638 (8.8M) | September 2015-January 2017 |
| Val | 2,280,573 (2.3M) | 2,192,259 (2.2M) | September 2015-January 2017 |
| Pros1 | 1,982,843 (2M) | 2,993,048 (3M) | February 2017 |
| Pros2 | 2,621,980 (2.6M) | 1,466,152 (1.5M) | March 2017 |
| Pros3 | 4,685,382 (4.7M) | 23,633 (24K) | April 2017 |
| Gold | 4,739,563 (4.7M) | 489,030 (0.5M) | N/A |

As also similarly described above, the example selection criteria are summarized below:
All examples have primary domain length ≥10
Negative:
  Always resolved
  Span >30 days
Positive:
  Never resolved
  Number of NXDomain responses ≥10
  Span ≤7 days
  Standard deviation ≤3 days This DNS data can be further separated into retrospective and prospective sets. The retrospective data is a balanced set of 12 million positive and 12 million negative examples from September 2015 through January 2017. In this example, 80% is used for training, and 20% is reserved for validation (e.g., examples for each split can be chosen at random). The prospective sets are reserved to evaluate the performance of the classifier(s) on future traffic, including domains observed from a later time period and not necessarily present in the training set. Specifically, in this example, the prospective sets include positive and negative examples from February, March, and April 2017.

Regarding repeated domains in this example DNS data, to avoid having duplicates across any of the data sets, duplicates within a given set are removed. Furthermore, any given domain may only exist in one data set (e.g., the set each domain is placed in depends on its earliest date of observation).

It is also important to note that the number of negatives drops considerably across the prospective sets. This is due to the time at which the sets were generated. The above-described filter for span of days takes all observations into account across the entire span of data (e.g., September 2015 through April 2017), and thus unique domains observed in more recent months have less opportunity to span over 30 days. The retrospective and prospective sets corresponding to the results of this example analysis were generated in May 2017.

For ground truth validation, as similarly described above, DGArchive [2] and Alexa Top Websites [1] are used to create a small truth marked data set (e.g., which is referred to as the Gold set; see Table I). DGArchive is a small repository of known DGA domains. These are collected using reverse engineered malware, forecasted seeds, and active dictionaries to match actual DGA domains in real traffic. The Alexa Top Websites web service provides access to lists of web sites ordered by Alexa Traffic Rank, which can be assumed legitimate. This data can then be filtered, limiting to domains which are not observed in the training data set, and have at least 10 characters in the SLD label based on the above-described example filtering criteria. Before any filtering, this example data set includes 6,598, 492 DGArchive domains and 1,000,000 Alexa domains. First, domains that overlap with the training set are removed, leaving 5,893,625 positives and 986,886 negatives. Second, the above-described additional filters are applied to match the form of domains in the training data, leaving 4,739,563 positives and 489,030 negatives to make predictions on. When using this set for evaluation, all domains removed in the second filtering step are deemed to be negative predictions.

Feature Based Approach

In addition to the disclosed deep learning techniques for facilitating inline DGA detection which will be further described below, the use of traditional, feature based machine learning algorithms for inline DGA detection will now be described. These algorithms do not present the advantages we are looking for in the deep learning approach, such as online learning and automatic feature extraction, but can be used to provide a baseline against which the deep learning approach can be compared. We explored many approaches, including K-Nearest Neighbor, SVM, and Ada-Boost. We also experimented using various training sizes in the feature-based approach, checking performance when using ten thousand, 50 thousand, 100 thousand, two hundred thousand, five hundred thousand, one million, and five million random samples of the training set to fit the models. An example of an effective feature-based method is a random forest trained with one hundred thousand examples, and as such, this is present as our baseline as further described below.

To fit our feature-based model, we extract the following example 11 features from each domain name string (e.g., see below for a more detailed description of each feature) (e.g., see also [3], [4]):
ent: normalized entropy of characters
nl2: median of 2-gram
nl3: median of 3-gram
naz: symbol character ratio
hex: hex character ratio
vwl: vowel character ratio
len: domain label length
gni: gini index of characters
cer: classification error of characters
tld: TLD hash
dgt: first character digit In information theory, entropy quantifies the information in a message (see e.g., [13] C. E. Shannon, "A mathematical theory of communication," The Bell System Technical Journal, vol. 27, 1948, pp. 379-423). Given a character set {x} within a text string, we compute the normalized entropy of characters in terms of its estimated distribution D(x) and its length len:

$$ent = \frac{-\sum_{x} D(x)\log D(x)}{\log len}$$

Normalizing in this fashion makes this feature invariant to changes in primary domain length.

The Gini index of characters is another measure of information, and is bounded between zero and one. It is computed as:

$$gni = 1 - \sum_{x} D^2(x)$$

$gni=1-Px$ $D2(x)$

The classification error of characters is a measure which provides some indication of the diversity of characters in the string. It is defined as:

$cer=1-\{D(x)\}$

The distribution of n-grams is not uniform in natural language, and thus n-gram frequency is a powerful feature for our classification task. Word frequencies are publicly available from Google's Ngram Viewer (see e.g., [14] Google Books Ngram Viewer, available at http://storage.googleapis.com/books/ngrams/books/datasetsv2.html). From this library, lookup tables can be created for the frequencies of 2-grams and 3-grams. Given a string, these tables can be used to look up the frequency of each 2-gram and 3-gram, and nl2 can be taken as the median of 2-gram frequencies, and nl3 as the median of 3-gram frequencies.

In addition, several example character ratio features for a given text string can be computed as follows:
naz (symbol character ratio): the number of characters that do not exist in the English alphabet divided by the string length.
hex (hex character ratio): the number of hexadecimal characters (A-F) divided by the string length.
vwl (vowel character ratio): the number of vowels divided by the string length.

The remaining features are defined as follows:
tld (TLD hash): a hash value is computed for each potential TLD and normalized to the range 0 to 1.
dgt (first character digit): a flag for whether the first character is or is not a numerical digit.
len: the length of the string taken as the primary domain name.

FIGS. 2A-K provide charts illustrating a distribution of selected features on a sample of the retrospective data with filtering in accordance with some embodiments. Specifically, the charts of FIGS. 2A-K show the distributions of all eleven features on a sample of the retrospective data with filtering. The curves shown with solid lines correspond to positive examples (NXDomains). The curves shown with dashed lines correspond to negative examples, which are likely legitimate.

Most of the example features above are chosen based on their discrimination power for distinguishing natural language sequences (e.g., many DGAs utilize sequences which are clearly distinct from natural language). Exceptions are the len, tld, and dgt features. Length can be used for grouping DGA families. TLD information can help indicate malicious domains, given that DGAs tend to use certain TLDs to avoid conflict with legitimate traffic. Whether the first character is a number should be in and of itself a strong signal for malicious domains. FIGS. 2A-K show the distributions of these features in the retrospective data. The curves shown with solid lines represent the distributions on positive domains; the curves shown with dashed lines represent the distributions on negative domains.

Deep Learning Approach

In one embodiment, two types of neural networks are trained: (1) convolutional neural networks (CNNs), and (2) recurrent neural networks (RNNs). Both types of neural networks can take raw data as input, bypassing the need for manual feature extraction.

Convolutional Neural Networks

CNNs are known for state-of-the-art advances in image processing, and apply to inputs of grid-like topology (see e.g., [15] I. Goodfellow, Y. Bengio, and A. Courville, Deep learning. MIT Press, 2016, available at http://www.deeplearningbook.org). CNNs automatically learn filters to detect patterns that are important for prediction. The presence (or lack) of these patterns is then used by the quintessential neural network (e.g., multilayer perceptron, or MLP) to make predictions. These filters (e.g., also called kernels) are learned during backpropagation. An intuitive example in image processing is a filter which detects vertical edges, regardless of their location in the image.

The underlying operation of CNNs is element-wise multiplication, performed between each filter and sub-sections of the input. The resulting values indicate the degree to which these sub-sections match the filters. In this manner, the filters are convolved over the input to form an activation map, which represents the locations of discovered features. Each subsequent convolutional layer achieves further abstraction, finding higher level features comprised of those detected in preceding layers.

Image processing is a case of 2-Dimensional convolution. For the task of DGA detection using strings, a 1-Dimensional convolution can be implemented.

Long Short Term Memory Models

RNNs are designed to learn dependencies across an input sequence, featuring an information loop that takes as input both the current timestep of a sequence and the output from the previous timestep (see e.g., [15]). LSTMs are a special type of RNN designed to track long-term dependencies, and are known for state-of-the-art advances in natural language processing.

Example Implementation Details

These example neural nets can be trained using Python2 and Tensorflow (see e.g., [16] M. Abadi, A. Agarwal, P. Barham, E. Brevdo, Z. Chen, C. Citro, G. S. Corrado, A. Davis, J. Dean, M. Devin, S. Ghemawat, I. Goodfellow, A. Harp, G. Irving, M. Isard, Y. Jia, R. Jozefowicz, L. Kaiser, M. Kudlur, J. Levenberg, D. Mané, R. Monga, S. Moore, D. Murray, C. Olah, M. Schuster, J. Shlens, B. Steiner, I. Sutskever, K. Talwar, P. Tucker, V. Vanhoucke, V. Vasudevan, F. Vie'gas, O. Vinyals, P. Warden, M. Wattenberg, M. Wicke, Y. Yu, and X. Zheng, "TensorFlow: Large-scale machine learning on heterogeneous distributed systems," 2015, available at http://tensorflow.org/). Specifically, Keras' API for rapid prototyping with Tensorflow and Theano can be utilized in an example implementation (see e.g., [17] F. Chollet. Keras, available at https://github.com/fchollet/keras). In this example implementation, the platform used for training is an AWS virtual machine with access to multiple GPUs.

Representation

As similarly described above, both models can be trained given only the domain name string as input. Each string is converted to lowercase, and then represented as a sequence of ASCII values corresponding to its characters. The maximum number of characters in a primary domain name is 63, so zeros can be used to pad the end such that all inputs have a fixed input width of 63. At this point, the input characters can be embedded using Keras' built-in embedding layer. Embedding techniques such as Word2Vec (see e.g., [18] T. Mikolov, K. Chen, G. Corrado, and J. Dean, "Efficient estimation of word representations in vector space," preprint arXiv:1301.3781, 2013) that map inputs to some vector space are now common practice in natural language processing. Generally, the goal is to map inputs which are similar for the given task closely together, resulting in improved performance. The embeddings are learned during training, separately for each model.

Deep Learning Models

The networks that are trained in the deep learning approach will now be described. Both operate at the character level and start with an embedding layer. The LSTM is taken from the architecture proposed in [10], but trained using Adam (see e.g., [19] D. Kingma and J. Ba, "Adam: A method for stochastic optimization," preprint arXiv:1412.6980, 2014), as opposed to RMSProp as the optimizer. The architecture is comprised of an embedding layer followed by an LSTM layer, a Dense (fully connected) layer, and finally a single node output layer. In this example implementation, the 'unroll' option can also be utilized, which accelerates training speed at the cost of memory use. Each layer defaults to 'glorot uniform' weight initialization (see e.g., [20] X. Glorot and Y. Bengio, "Understanding the difficulty of training deep feedforward neural networks," in Proc. of the 13th International Conference on Artificial Intelligence and Statistics, vol. 9, 2010, pp. 249-256).

The CNN is structured similarly. It features a 1-Dimensional convolutional layer in place of the LSTM layer, uses 'glorot normal' weight initialization (see [20]), and uses the rectified linear unit (ReLU) as the activation function on all but the output layer.

In this example implementation, dropout can also be utilized for both networks. Dropout is a technique to improve model performance and overcome overfitting by randomly excluding nodes during training, which serves to break up complex co-adaptations in the network (see e.g., [21] N. Srivastava, G. Hinton, A. Krizhevsky, I. Sutskever, and R. Salakhutdinov, "Dropout: a simple way to prevent neural networks from overfitting," Journal of Machine Learning Research, vol. 15, no. 1, 2014, pp. 1929-1958). This is confined to the training phase; all nodes are active during testing and deployment. In this example implementation, a 50% dropout is applied at the convolutional and LSTM layers.

These example models are defined in Keras as follows:
1) CNN:

```
model = Sequential(name='Seq')
model.add(Embedding(256, 128, input length=63))
model.add(Conv1D(1000, 2, padding='same',
    kernel initializer ='glorot normal',
    activation ='relu'))
model.add(Dropout(0.5))
```

```
    model.add(Flatten ( ))
    model.add(Dense(100, activation ='relu ',
        kernel initializer ='glorot normal'))
    model.add(Dense(1, activation ='sigmoid',
        kernel initializer ='glorot normal'))
    model.compile(loss='binary crossentropy ',
        optimizer='adam', metrics=['accuracy'])
```

2) LSTM:

```
    model = Sequential(name='Seq')
    model.add(Embedding(256, 128, input length=63,
        mask zero=False))
    model.add(LSTM(units=128, unroll=True))
    model.add(Dropout(0.5))
    model.add(Dense(100))
    model.add(Dense(1))
    model.add(Activation ('sigmoid'))
    adam = Adam(lr=0.001, beta 1=0.9, beta 2=0.999,
        epsilon=1e-08, decay=0.001)
    model.compile(loss='binary crossentropy ',
        optimizer=adam, metrics=['accuracy'])
```

For example, Table II shown below provides results against data filtered from real traffic (TPR$_0$: retrospective; TPR$_{1-3}$: prospective).

TABLE II

RESULTS AGAINST DATA FILTERED FROM REAL TRAFFIC.

| Model | TPR$_0$ | TPR$_1$ | TPR$_2$ | TPR$_3$ |
|---|---|---|---|---|
| CNN | 40.31% | 5.37% | 10.14% | 8.17% |
| LSTM | 40.46% | 2.43% | 8.49% | 6.64% |
| Random Forest | 60.67% | 57.68% | 59.61% | 59.45% |

Validation and Results

Validation

The metrics used to evaluate these example models are true positive rate (TPR), false positive rate (FPR), AUC (area under the ROC curve), and AUC under 1% false positive rate. Recall that TPR=TP/(TP+FN) and FPR=FP/(FP+TN) where TP, FP, TN, and FN are the number of true positives, false positives, true negatives, and false negatives respectively.

Figure 6:
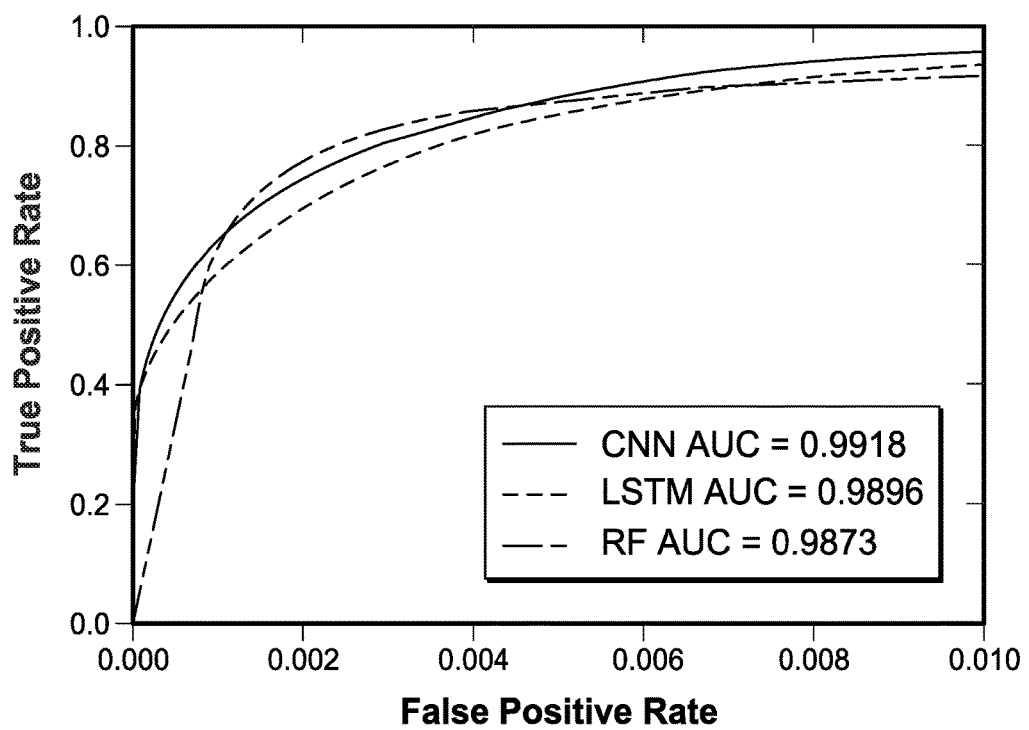
FIG. 6 is a combined graph of ROC curves for CNN, LSTM, and Random Forest.

Neural networks output a probability that a given example belongs to the positive class, and so we can choose a threshold probability at which to consider a prediction positive. ROC curves plot TPR versus FPR as the threshold is changed, such as shown in FIG. 6. AUC is the integral of this curve. AUC values tending towards 1.0 indicate strong predictive performance, while the value 0.5 is effectively random guessing.

In this example implementation, a low false positive rate is the most important quality for our models. If they are to be deployed, blocking legitimate traffic would ideally be a rare occurrence. For each model (both deep learning and feature-based), the threshold can be tuned for a false positive rate of 0.01%, or 1 in 10,000. This strict threshold means that these example models should be extremely confident before flagging a domain as malicious, and comes at the cost of severely reduced TPR. To do this, a threshold is chosen that provides a 0.01% FPR on the validation set. We assume that negatives are largely consistent over time, and thus this FPR is roughly maintained on the prospective sets.

Given that we are primarily interested in model performance at low FPR, we focus on the AUC under 1% FPR. This is the integral of the ROC curve from FPR=0 to FPR=0.01. An ideal classifier would achieve an AUC under FPR=1% of 0.01.

These metrics can be applied for each example model against the data sets described above (see e.g., Creation of the Data Set section). The size of the training data set and the variety of different test sets obviate the need for K-fold cross-validation.

Figure 4:
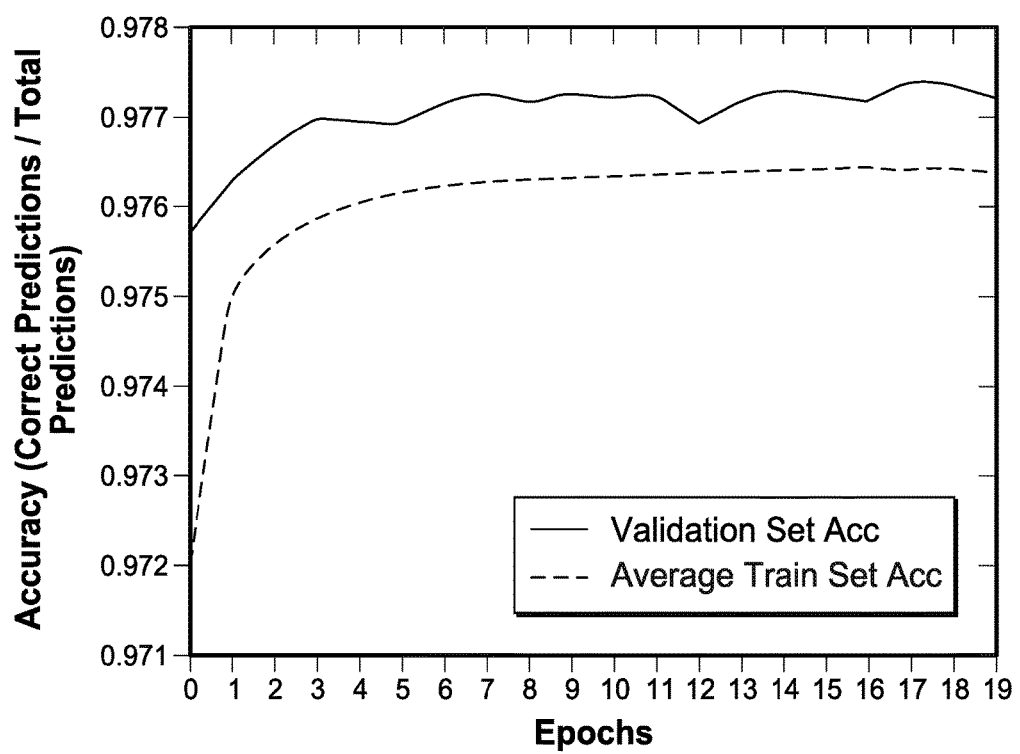
FIG. 4 is a graph of an accuracy over epochs for CNN.
Figure 5:
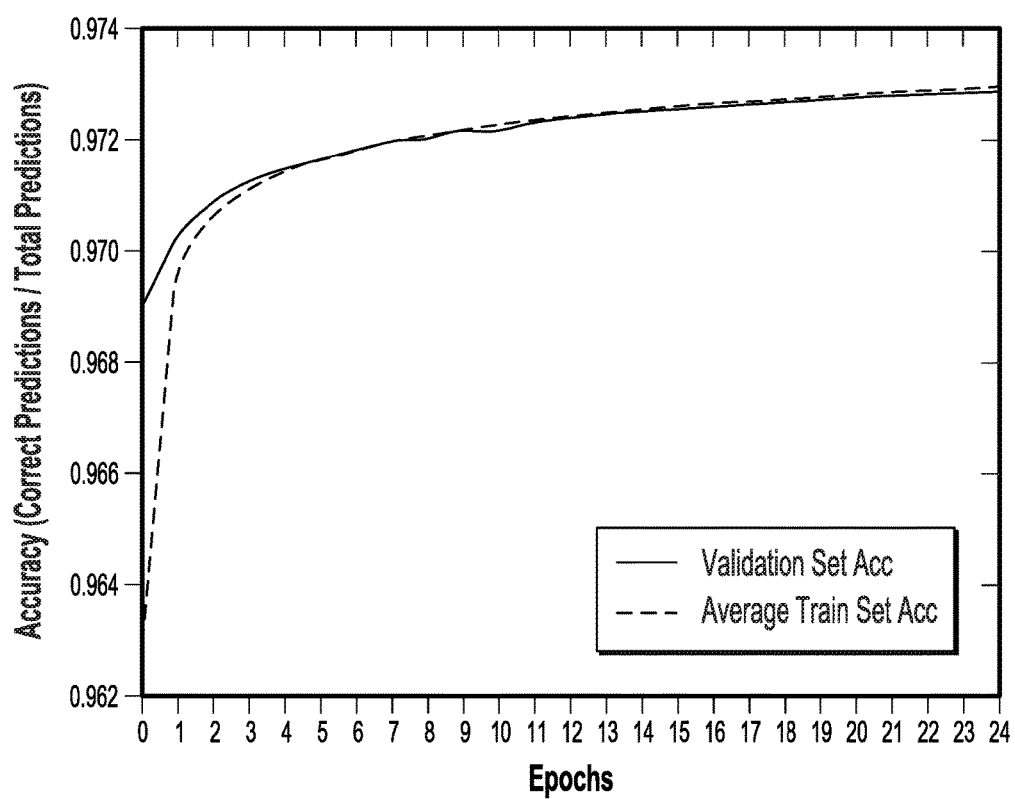
FIG. 5 is a graph of an accuracy over epochs for LSTM.

For both deep learning models, training convergence curves are also presented, which show how the accuracy improves after each iteration over the training data; as shown in FIGS. 4 and 5. Note that the accuracies are found using a prediction threshold of 0.5 (i.e., these curves reflect performance before choosing a threshold for low FPR). It is also important to point out that the training accuracy is lower than the validation accuracy in these curves. The accuracy against the training set is computed in an averaged way across batches while dropout is being applied, whereas performance on the validation set is determined at the end of each epoch with dropout disabled.

For example, Table III shown below provides results against truth marked gold set from Alexa and DGARchive.

TABLE III

RESULTS AGAINST TRUTH MARKED GOLD SET FROM ALEXA AND DGARCHIVE.

| Model | TPR | FPR |
|---|---|---|
| CNN | 72.89% | 0.31% |
| LSTM | 74.05% | 0.54% |
| Random Forest | 71.28% | 1.33% |

Figure 3:
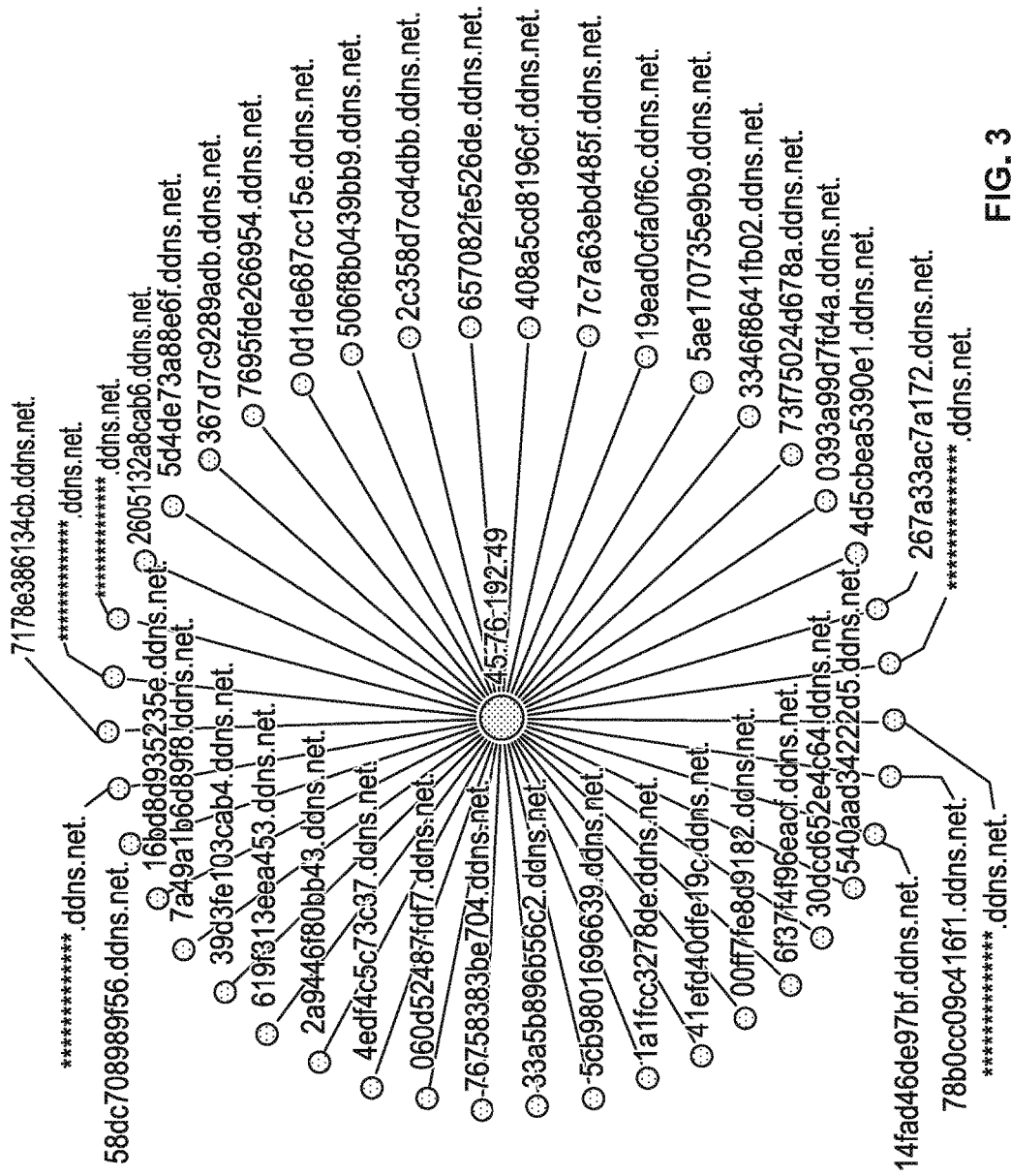
FIG. 3 is a graph of domains that resolve to a potentially malicious host in accordance with some embodiments.

FIG. 3 is a graph of domains that resolve to a potentially malicious host in accordance with some embodiments. Specifically, FIG. 3 is a screenshot of an example user interface (UI) that generates a graph of domains that resolve to a potentially malicious host discovered through deployment of the disclosed CNN model on a live stream of traffic as described above.

Evaluation of Metrics

Results against our data from real traffic are shown in Table II. The four columns give TPR against the validation set, Pros1, Pros2, and Pros3 from left to right (e.g., each TPR is given at 1 in 10,000 FPR). By these metrics, it is seen that the random forest classifier with the 11 example features presented above (e.g., in the Feature Based Approach section) is far more effective at modeling our filtered data, especially the prospective sets. The random forest achieves 60.67% TPR on the validation set (see TPR0), beating the deep learning models by roughly 20%. We see in TPR1, TPR2, and TPR3 that the random forest maintains good performance, whereas both deep learning models see extreme drops in TPR on the prospective data. The CNN outperforms the LSTM model by all metrics except for slightly worse TPR on the validation set.

FIG. 4 is a graph of an accuracy over epochs for CNN.

For example, Table IV shown below provides results against DGARchive breakup by DGA family.

TABLE IV

RESULTS AGAINST DGARCHIVE BREAKUP BY DGA FAMILY.

| DGA Family | Size Before Filter | Size After Filter | CNN | LSTM | Random Forest |
|---|---|---|---|---|---|
| bamital | 225,911 | 225,911 | 100.00% | 100.00% | 99.96% |
| banjori | 421,383 | 421,383 | 17.02% | 30.54% | 15.31% |
| bedep | 14,473 | 14,473 | 97.19% | 96.14% | 93.87% |
| bcebone | 210 | 105 | 0.00% | 0.00% | 50.00% |
| blackhole | 623 | 623 | 99.04% | 99.20% | 96.95% |
| bobax | 300 | 128 | 42.00% | 42.00% | 42.67% |
| conflicker | 1,511,912 | 359,783 | 23.10% | 23.10% | 22.67% |
| corcbot | 147,030 | 147,030 | 91.84% | 99.63% | 95.46% |
| cryptolocker | 1,183,256 | 1,183,256 | 98.17% | 98.14% | 96.41% |
| darkshell | 49 | 0 | 0.00% | 0.00% | 0.00% |
| dircrypt | 538 | 451 | 82.90% | 82.71% | 81.04% |
| dnsbenchmark | 5 | 5 | 100.00% | 100.00% | 100.00% |
| dnschanger | 1,499,578 | 1,499,578 | 96.79% | 96.84% | 92.70% |
| downloader | 60 | 0 | 0.00% | 0.00% | 0.00% |
| dyrc | 746,962 | 746,962 | 100.00% | 100.00% | 100.00% |
| ckforward | 1460 | 0 | 0.00% | 0.00% | 0.00% |
| emotet | 137,687 | 137,687 | 99.01% | 98.96% | 96.37% |
| feodo | 192 | 192 | 99.48% | 100.00% | 98.44% |
| fobber | 1,996 | 1,996 | 98.25% | 98.15% | 95.34% |

FIG. 5 is a graph of an accuracy over epochs for LSTM. Evaluation on Truth Marked Data Due to the lack of ground truth in our filtered data, we also evaluate against a small truth marked set for concrete validation (see the Gold set described above in the Creation of the Data Set section). We evaluate each model against this set using the same threshold for 1 in 10,000 FPR determined from the validation set. The resulting true and false positive rates are shown in Table III. We also show the percentages of each DGA family found in the Gold set in Table IV. Note that the totals for the Gold set in Table I only show the number of examples given to our classifier. Many examples are filtered out so that inputs follow the same form as domains in the training data (see the Creation of the Data Set section). In computing results for the Gold set, we count any domains which were filtered out as negative predictions (except those initially removed for having overlap with the training data). These additional negative predictions are accounted for in Table III and Table IV to better represent the actual performance of our approach, since the same filtering should be applied in deployment. To summarize, we have:

DGArchive:
   Before deleting duplicates: 6,598,492
   After deleting duplicates: 5,893,625
   Positives input to classifier: 4,739,563
   Positives counted as negative predictions from filtering: 1,154,062

Alexa 1M:
   Before deleting duplicates: 1,000,000
   After deleting duplicates: 986,886
   Negatives input to classifier: 489,030
   Negatives counted as negative predictions from filtering: 497,856

For example, Table V shown below provides a comparison of false positives to DGARCHIVE.

TABLE V

COMPARISON OF FALSE POSITIVES TO DGARCHIVE (FP: TOTAL NUMBER OF FP ON RETROSPECTIVE AND PROSPECTIVE SETS; FP ON DGARCHIVE: NUMBER OF SUCH FP WHICH WERE FOUND TO BE KNOWN DGA DOMAINS; PERCENT MATCH: FP ON DGARCHIVE/FP).

| DGA Family | Size Before Filter | Size After Filter | CNN | LSTM | Random Forest |
|---|---|---|---|---|---|
| bamital | 225,911 | 225,911 | 100.00% | 100.00% | 99.96% |
| banjori | 421,383 | 421,383 | 17.02% | 30.54% | 15.31% |
| bedep | 14,473 | 14,473 | 97.19% | 96.14% | 93.87% |
| bcebone | 210 | 105 | 0.00% | 0.00% | 50.00% |
| blackhole | 623 | 623 | 99.04% | 99.20% | 96.95% |
| bobax | 300 | 128 | 42.00% | 42.00% | 42.67% |
| conflicker | 1,511,912 | 359,783 | 23.10% | 23.10% | 22.67% |
| corcbot | 147,030 | 147,030 | 91.84% | 99.63% | 95.46% |
| cryptolocker | 1,183,256 | 1,183,256 | 98.17% | 98.14% | 96.41% |
| darkshell | 49 | 0 | 0.00% | 0.00% | 0.00% |
| dircrypt | 538 | 451 | 82.90% | 82.71% | 81.04% |
| dnsbenchmark | 5 | 5 | 100.00% | 100.00% | 100.00% |
| dnschanger | 1,499,578 | 1,499,578 | 96.79% | 96.84% | 92.70% |
| downloader | 60 | 0 | 0.00% | 0.00% | 0.00% |
| dyrc | 746,962 | 746,962 | 100.00% | 100.00% | 100.00% |
| ckforward | 1460 | 0 | 0.00% | 0.00% | 0.00% |

TABLE V-continued

COMPARISON OF FALSE POSITIVES TO DGARCHIVE (FP: TOTAL
NUMBER OF FP ON RETROSPECTIVE AND PROSPECTIVE SETS;
FP ON DGARCHIVE: NUMBER OF SUCH FP WHICH WERE FOUND
TO BE KNOWN DGA DOMAINS; PERCENT MATCH: FP ON
DGARCHIVE/FP).

| DGA Family | Size Before Filter | Size After Filter | CNN | LSTM | Random Forest |
|---|---|---|---|---|---|
| emotet | 137,687 | 137,687 | 99.01% | 98.96% | 96.37% |
| feodo | 192 | 192 | 99.48% | 100.00% | 98.44% |
| fobber | 1,996 | 1,996 | 98.25% | 98.15% | 95.34% |

FIG. 6 is a combined graph of ROC curves for CNN, LSTM, and Random Forest.

In this example, we additionally check for false positives from our retrospective and prospective sets that exist on DGArchive. Our data is not noise-free, and thus it is reasonable that some DGA domains in our data are labeled negative. Our classifier may successfully identify these domains, but these instances will be counted as false positives due to an incorrect label. Table V shows the total number of false positives in each set, followed by the number and percentage of false positives which were found to be real DGA domains. The significant overlap suggests that our actual FPR on real traffic may be lower than the target rate of 0.01%.

We expect these DGA domains that appear as negatives are mostly honeypots. To monitor malware activity, researchers have registered known DGA domains to track when they are queried. In our selection logic, we choose negatives as domains which are queried over a 30-day span and never get an NXDomain response. Hence, active DGA domains will appear as negatives if registered as honeypots throughout our dates of observation.

Live Stream Deployment

Finally, the above-described CNN model is deployed on a live stream of resolving traffic. Each domain flagged resolves to some host IP address, which can then be further inspected manually. FIG. 3 is a screenshot of an example user interface (UI), which shows domains from the live stream that resolved to a given IP address within the previous seven days (e.g., the UI can update daily to show a seven day history for any given host IP encountered in the live stream). The particular IP address shown is a host resolved to by one of the domains flagged in this experiment. In this manner, we are able to gain further confidence that our model catches DGA domains on live traffic.

Analysis

Despite appearing disadvantaged in tests against our filtered data, the deep learning approach shows markedly better performance on the truth marked Gold set (see Table III). This may indicate the deep learning models better handle noise in our data. The CNN achieves 72.89% TPR and 0.31% FPR on the Gold set. The LSTM results in slightly better TPR (74.05%), but at significantly worse FPR (0.54%).

For example, Table VI shown below provides a comparison of CNN model and LSTM model predictions on negative examples from the validation data set.

TABLE VI

COMPARISON OF CNN AND LSTM PREDICTIONS ON
NEGATIVE EXAMPLES FROM VALIDATION SET.

|  | LSTM-Neg | LSTM-Pos |
|---|---|---|
| CNN-Neg | 2,191,881 | 159 |
| CNN-Pos | 159 | 60 |

For example, Table VII shown below provides a comparison of CNN model and LSTM model predictions on positive examples from the validation data set.

TABLE VII

COMPARISON OF CNN AND LSTM PREDICTIONS ON
POSITIVE EXAMPLES FROM VALIDATION SET.

|  | LSTM-Neg | LSTM-Pos |
|---|---|---|
| CNN-Neg | 1,246,892 | 114,427 |
| CNN-Pos | 110,885 | 808,369 |

Inspecting classification examples, we find that our models, in general, flagged domains which contain effectively gibberish sequences (i.e., sequences which clearly differ from natural language). Strictly dictionary-based DGA domains (e.g., those crafted by concatenating words selected from a set vocabulary) were not detected upon a manual inspection. However, domains that contain both words and gibberish sequences are caught. The only DGA to incorporate words in the Gold set is banjori, which seems to feature a mix of natural and non-natural sequences, and we see far worse performance on these domains compared to others (see Table IV). Our models are also unable to catch any instances of beebone, which (at least in our sample) features two concatenated words followed by a number, with a large variety of TLDs. Other than these, we see low performance where large portions of the DGA family are filtered out.

We originally anticipated that a CNN would be able to detect dictionary-based DGAs by learning their vocabulary. We observe that dictionary-based DGA domains make up a small portion of DGA traffic, and it is unlikely our filtering gives a strong enough signal for these types of domains to be learned. However, we have come to believe that catching these domains with high accuracy is very challenging in a real-time approach for inline DGA detection. The reason for this is what we have begun to refer to as active dictionaries. The sets of words observed from dictionary-based DGAs can change on a daily basis: the dictionary is swapped such that the same DGA produces domains from new vocabulary.

Looking into classification examples, there is no obvious difference between the CNN and LSTM in terms of what is and is not classified malicious. We find that the neural networks largely agree; we show how their predictions compare in Tables VI and VII. On the validation set, the neural nets agree on 99.985% of negative examples and 90.120% of positive examples.

An important note not yet discussed is that blocking suspicious host IPs may be left to the client's discretion. In one embodiment, the DNS server can refuse to return IPs which exceed a certain threshold of suspicion. In another embodiment, a DNS response can return the host IP address as usual, but also include a score indicating the likelihood that it is malicious. For example, this system would allow clients to choose their own threshold to better suit their security requirements as needed.

Additional Embodiments for Improving Performance for Inline DGA Detection with Deep Networks Many options and alternatives exist for improving performance. In our experiments, we set a predetermined number of epochs for simplicity. However, the training history of the LSTM (see FIG. 5) indicates it would likely benefit from further epochs. Furthermore, the CNN achieved its best accuracy on the validation data after 18 epochs (see FIG. 4). Generally, only the model weights which perform best on the validation data during training should be retained. Our results are intended to validate the hypothesis of this work, and better training practices may be used for a deployment model for inline DGA detection. However, unlike many other deep learning projects, we do not look for higher accuracy on training nor validation data set since they are not noise-free. The objective is to have higher TPR on prospective test data sets while keeping a very low FPR.

Neural networks themselves have many parameters to tune. Primary parameters include choices such as network architecture, weight initialization, and regularization methods. Secondary parameters include choice of optimizer (and its respective parameters), activation function for each layer, loss function for weight updates, and batch size (e.g., the number of examples observed per weight update). After independently tuning these models, an alternative embodiment is to merge LSTM and CNN architectures for an ensemble deep learning approach. Also notable is that LSTMs can accept variable length inputs, as opposed to the fixed width padded inputs of the above-described techniques.

Finally, the domain name string contains a key piece of additional information which we did not provide our networks: the TLD. DGAs tend to select TLDs to avoid collisions with legitimate traffic, and thus TLD information is highly valuable for DGA detection. In one embodiment, TLD information is incorporated into our neural networks to improve performance.

Both CNN and LSTM models are underperforming on dictionary-based DGAs. One possible reason can be biased sample distribution between traditional and dictionary-based DGAs. In one embodiment, an unsupervised machine learning technique is applied to separate positive samples using above mentioned features. This can turn the two-class supervised machine learning problem into three-class. Therefore, detection performance on dictionary-based DGAs can be significantly improved using such an unsupervised machine learning technique.

Inline DGA Detection with Deep Networks and Online Continuous Learning

Accordingly, in various embodiments described above, the disclosed techniques include applying supervised learning for real-time DGA detection. In various embodiments, we used example filtering operations that are performed to obtain sufficiently pure DGA/non-DGA samples from real DNS traffic to facilitate providing a deployable model for inline DGA detection. As similarly described above, approaches that depend on reverse engineered malware are simply not scalable and adaptive to changes in real traffic. Moreover, in various embodiments, we disclosed utilizing deep learning for the advantages of automatic feature extraction and the potential for continuous online learning to keep up with changes in DGA domain patterns. Various traditional methods were also implemented and described above for comparison and to verify that the disclosed deep network models (e.g., classifiers) are also superior DGA detectors for inline DGA detection (e.g., as described above, these example models were tuned for a target false positive rate as low as 0.01%, and tested on three prospective data sets as well as truth marked data from third parties).

Moreover, the disclosed techniques include online continuous training (e.g., including automatic feature extraction). For example, the nature of the automatic truth labeling (NXDOMAIN) in the disclosed techniques facilitates a solution that can continuously train and refine the classifier after online deployment without human interaction.

Example Processes for Inline DGA Detection with Deep Networks

Figure 7:
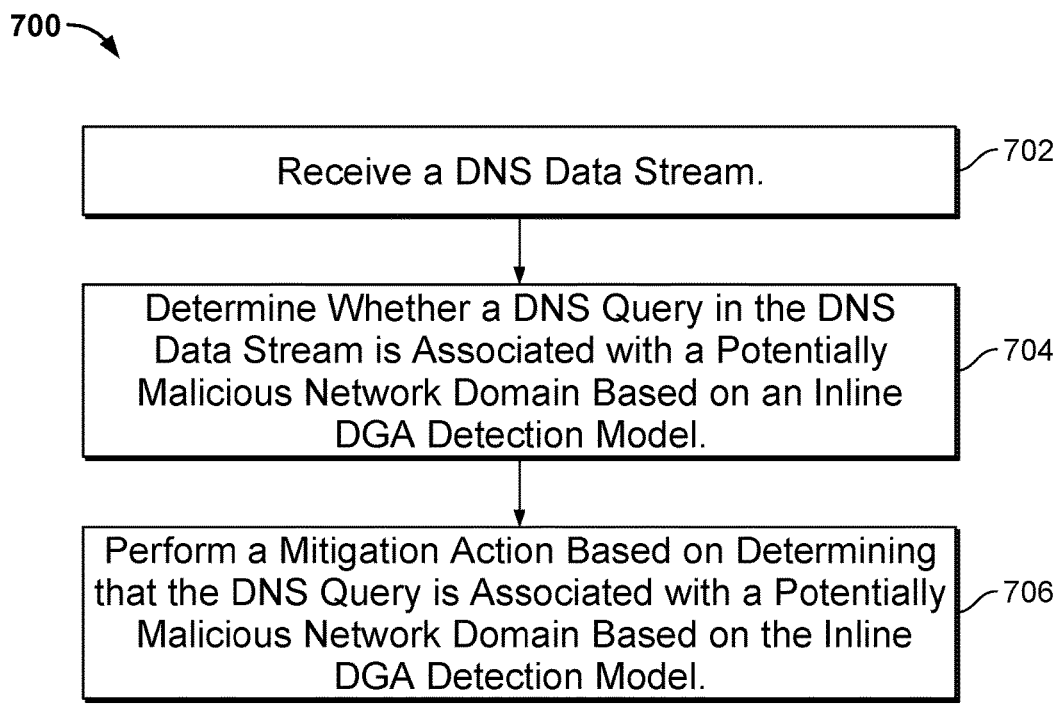
FIG. 7 is a flow diagram illustrating a process for inline DGA detection with deep networks in accordance with some embodiments.

FIG. 7 is a flow diagram illustrating a process for inline DGA detection with deep networks in accordance with some embodiments. In various embodiments, process 700 is performed by the system(s) described above with respect to FIGS. 1A and/or 1B.

At 702, a DNS data stream is received. For example, the DNS data stream can include a DNS query and a DNS response for resolution of the DNS query.

At 704, determining whether the DNS query is associated with a potentially malicious network domain based on an inline DGA detection model (e.g., a classifier) is performed. For example, various techniques are disclosed for implementing an inline DGA detection model (e.g., a classifier).

At 706, a mitigation action is performed if it is determined that the DNS query is associated with a potentially malicious network domain based on the inline DGA detection model. For example, the mitigation action can include a configuration action and/or a filtering action (e.g., block or drop packets to/from the bad/malware network domain and/or bad/malware IP address associated with the potentially malicious network domain). As another example, the mitigation action can include configuring a network device (e.g., a switch or router, implemented as a physical or virtual switch/router) to quarantine the infected host and/or block access to the bad network domain and/or bad IP address associated with DNS tunneling activity, using network access control or other mechanisms to quarantine the infected host and/or block access to the bad network domain and/or bad IP address, configuring a security device controller using Open Flow techniques to configure a network device (e.g., a switch or router, implemented as a physical or virtual switch/router) to quarantine the infected host and/or block access to the bad network domain and/or bad IP address, and/or to implement other configuration/programming techniques such as via API or publish/subscribe mechanisms to configure a network device (e.g., a switch or router, implemented as a physical or virtual switch/router) to quarantine the infected host and/or block access to the bad network domain and/or bad IP address.

Figure 8:
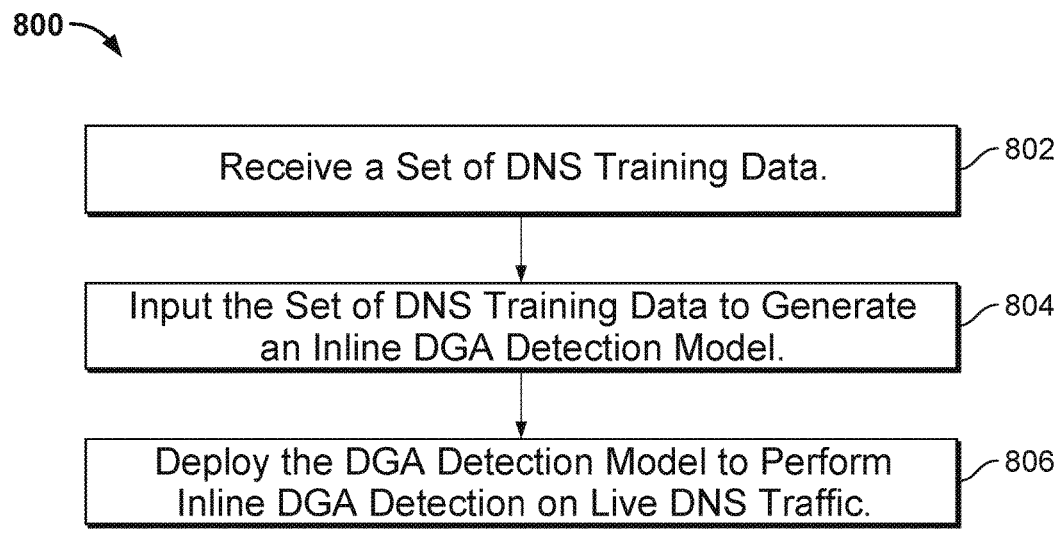
FIG. 8 is another flow diagram illustrating a process for inline DGA detection with deep networks in accordance with some embodiments.

FIG. 8 is another flow diagram illustrating a process for inline DGA detection with deep networks in accordance with some embodiments. In various embodiments, process 800 is performed by the system(s) and techniques described above with respect to FIGS. 1A-1B through 6.

At 802, a set of DNS training data is received. For example, the set of DNS training data can include resolved and unresolved DNS query results.

At 804, inputting the set of DNS training data to generate an inline DGA detection model is performed. For example, various techniques are disclosed for generating an inline DGA detection model (e.g., a classifier) using deep learning techniques on actual DNS traffic data.

At 806, the inline DGA detection model is deployed to perform inline DGA detection on live DNS traffic. For example, the deployed inline DGA detection model (e.g., classifier) can continue online learning on live DNS traffic (e.g., including automatic feature extraction) using the disclosed techniques as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor; and
    a memory coupled with the processor, wherein the memory is configured to provide the processor with instructions which when executed cause the processor to:
        receive a domain name system (DNS) data stream, wherein the DNS data stream includes a DNS query and a DNS response for resolution of the DNS query;
        determine whether the DNS query is associated with a potentially malicious network domain based on an inline domain generation algorithm (DGA) detection model, comprising to:
            determine whether the DNS query is a potentially malicious network domain based on the inline DGA detection model by inputting into the inline DGA detection model five or more of the following:
                a normalized entropy of characters of a domain associated with the DNS query, the entropy of the characters being based on the distribution of the characters of the domain and a length of the domain;
                a symbol character ratio determined based on a number of characters of the domain that do not exist in the English alphabet and the length of the domain;
                a hex character ratio determined based on a number of hexadecimal characters of the domain and the length of the domain;
                a vowel character ratio determined based on a number of vowel in the domain and the length of the domain;
                a top level domain (TLD) hash determined based on a potential TLD; or
                a dgt (first character digit) corresponding to a flag for whether a first character of the domain is or is not a numerical digit; and
        perform a mitigation action if it is determined that the DNS query is associated with the potentially malicious network domain based on the inline DGA detection model.

2. The system recited in claim 1, wherein the DNS data stream is a live DNS data stream.

3. The system recited in claim 1, wherein the inline DGA detection model includes a classifier.

4. The system recited in claim 1, wherein the mitigation action includes blocking the DNS response.

5. The system recited in claim 1, wherein the inline DGA detection model includes a classifier generated using a deep neural network and training data.

6. The system recited in claim 1, wherein the processor is further configured to:
    block the DNS response to impede a client communication with a command and control server.

7. The system recited in claim 1, wherein the DNS response for resolution of the DNS query includes an IP address, and wherein the processor is further configured to:
    add the IP address associated with the potentially malicious network domain to a blacklist.

8. The system recited in claim 1, wherein the DNS response for resolution of the DNS query includes an IP address, and wherein the processor is further configured to:
    send the IP address associated with the potentially malicious network domain to a firewall.

9. The system recited in claim 1, wherein the processor is further configured to perform one or more mitigation actions, comprising to:
    generate a firewall rule based on the potentially malicious network domain;
    configure a network device to block network communications with the potentially malicious network domain;
    quarantine an infected host, wherein the infected host is determined to be infected based on an association with the potentially malicious network domain; and
    add the potentially malicious network domain to a reputation feed.

10. The system recited in claim 1, wherein the processor is further configured to:
    identify a source IP address, a source host, or an attempt to query the potentially malicious network domain.

11. The system recited in claim 1, wherein the determining of whether the DNS query is a potentially malicious network domain based on the inline DGA detection model by inputting into the inline DGA detection model the following:
    a normalized entropy of characters of a domain associated with the DNS query, the entropy of the characters being based on the distribution of the characters of the domain and a length of the domain;
    a symbol character ratio determined based on a number of characters of the domain that do not exist in the English alphabet and the length of the domain;
    a hex character ratio determined based on a number of hexadecimal characters of the domain and the length of the domain;
    a vowel character ratio determined based on a number of vowel in the domain and the length of the domain;
    a top level domain (TLD) hash determined based on a potential TLD; and
    a dgt (first character digit) corresponding to a flag for whether a first character of the domain is or is not a numerical digit.

12. A method, comprising:
    receiving a domain name system (DNS) data stream, wherein the DNS data stream includes a DNS query and a DNS response for resolution of the DNS query;
    determining whether the DNS query is associated with a potentially malicious network domain based on an inline domain generation algorithm (DGA) detection model, comprising:
        determining whether the DNS query is a potentially malicious network domain based on the inline DGA detection model by inputting into the inline DGA detection model five or more of the following:
- a normalized entropy of characters of a domain associated with the DNS query, the entropy of the characters being based on the distribution of the characters of the domain and a length of the domain;
- a symbol character ratio determined based on a number of characters of the domain that do not exist in the English alphabet and the length of the domain;
- a hex character ratio determined based on a number of hexadecimal characters of the domain and the length of the domain;
- a vowel character ratio determined based on a number of vowel in the domain and the length of the domain;
- a top level domain (TLD) hash determined based on a potential TLD; or
- a dgt (first character digit) corresponding to a flag for whether a first character of the domain is or is not a numerical digit; and performing a mitigation action if it is determined that the DNS query is associated with the potentially malicious network domain based on the inline DGA detection model.

13. The method of claim 12, wherein the DNS data stream is a live DNS data stream.

14. The method of claim 12, wherein the inline DGA detection model includes a classifier.

15. The method of claim 12, wherein the mitigation action includes blocking the DNS response.

16. The method of claim 12, wherein the inline DGA detection model includes a classifier generated using a deep neural network and training data.

17. A computer program product, the computer program product being embodied in a tangible non-transitory computer readable storage medium and comprising computer instructions for:
- receiving a domain name system (DNS) data stream, wherein the DNS data stream includes a DNS query and a DNS response for resolution of the DNS query;
- determining whether the DNS query is associated with a potentially malicious network domain based on an inline domain generation algorithm (DGA) detection model, comprising:
  - determining whether the DNS query is a potentially malicious network domain based on the inline DGA detection model by inputting into the inline DGA detection model five or more of the following:
    - a normalized entropy of characters of a domain associated with the DNS query, the entropy of the characters being based on the distribution of the characters of the domain and a length of the domain;
    - a symbol character ratio determined based on a number of characters of the domain that do not exist in the English alphabet and the length of the domain;
    - a hex character ratio determined based on a number of hexadecimal characters of the domain and the length of the domain;
    - a vowel character ratio determined based on a number of vowel in the domain and the length of the domain;
    - a top level domain (TLD) hash determined based on a potential TLD; or
    - a dgt (first character digit) corresponding to a flag for whether a first character of the domain is or is not a numerical digit; and performing a mitigation action if it is determined that the DNS query is associated with the potentially malicious network domain based on the inline DGA detection model.

18. The computer program product recited in claim 17, wherein the DNS data stream is a live DNS data stream.

19. The computer program product recited in claim 17, wherein the inline DGA detection model includes a classifier.

20. The computer program product recited in claim 17, wherein the mitigation action includes blocking the DNS response.

21. The computer program product recited in claim 17, wherein the inline DGA detection model includes a classifier generated using a deep neural network and training data.

22. A system, comprising:
- a processor; and
- a memory coupled with the processor, wherein the memory is configured to provide the processor with instructions which when executed cause the processor to:
  - receive a set of domain name system (DNS) training data, wherein the set of DNS training data includes a DNS query, wherein the set of DNS training data includes resolved and unresolved DNS query results;
  - input the set of DNS training data to generate an inline domain generation algorithm (DGA) detection model using a deep neural network, wherein the inline DGA detection model includes a classifier, wherein the inputting of the set of DNS training data comprises to:
    - extract five or more of the following from the set of DNS training data:
      - a normalized entropy of characters of a domain associated with the DNS query, the entropy of the characters being based on the distribution of the characters of the domain and a length of the domain;
      - a symbol character ratio determined based on a number of characters of the domain that do not exist in the English alphabet and the length of the domain;
      - a hex character ratio determined based on a number of hexadecimal characters of the domain and the length of the domain;
      - a vowel character ratio determined based on a number of vowel in the domain and the length of the domain;
      - a top level domain (TLD) hash determined based on a potential TLD; or
      - a dgt (first character digit) corresponding to a flag for whether a first character of the domain is or is not a numerical digit; and
  - deploy the inline DGA detection model to perform inline DGA detection on live DNS traffic.

23. The system recited in claim 22, wherein the deployed inline DGA detection model continues online learning on the live DNS traffic.

* * * * *

UNITED STATES PATENT AND TRADEMARK OFFICE
CERTIFICATE OF CORRECTION

PATENT NO. : 10,498,751 B2
APPLICATION NO. : 15/721210
DATED : December 3, 2019
INVENTOR(S) : Bin Yu and Mark Threefoot Page 1 of 1

It is certified that error appears in the above-identified patent and that said Letters Patent is hereby corrected as shown below:

In page 2, Column 1, item (56), references cited, other publications, Line 16, delete "Proccedings" and insert --Proceedings--, therefor.

In Column 12, Line(s) 28-29, delete "cer=1-{D(x)}" and insert --cer=1-max{D(x)}--, therefor.

Signed and Sealed this
Second Day of June, 2020

Andrei Iancu
*Director of the United States Patent and Trademark Office*